(12) United States Patent
Eleftheriadis et al.

(10) Patent No.: US 10,990,890 B2
(45) Date of Patent: Apr. 27, 2021

(54) MACHINE LEARNING SYSTEM

(71) Applicant: Secondmind Limited, Cambridge (GB)

(72) Inventors: Stefanos Eleftheriadis, Cambridge (GB); James Hensman, Cambridge (GB); Sebastian John, Cambridge (GB); Hugh Salimbeni, Cambridge (GB)

(73) Assignee: SECONDMIND LIMITED, Cambridge (GB)

( * ) Notice: Subject to any disclaimer, the term of this patent is extended or adjusted under 35 U.S.C. 154(b) by 0 days.

(21) Appl. No.: 16/824,025

(22) Filed: Mar. 19, 2020

(65) Prior Publication Data
US 2020/0218999 A1  Jul. 9, 2020

Related U.S. Application Data

(63) Continuation of application No. PCT/EP2018/077062, filed on Apr. 10, 2018.

(30) Foreign Application Priority Data

Nov. 21, 2017 (EP) .................................. 17275185
Mar. 29, 2018 (EP) .................................. 18165197

(51) Int. Cl.
*G06N 7/00* (2006.01)
*G06N 20/00* (2019.01)
(Continued)

(52) U.S. Cl.
CPC ............. *G06N 7/005* (2013.01); *G06F 17/17* (2013.01); *G06N 3/08* (2013.01); *G06N 20/00* (2019.01);
(Continued)

(58) Field of Classification Search
CPC ...................................................... G06N 7/005
(Continued)

(56) References Cited

U.S. PATENT DOCUMENTS 9,314,924 B1    4/2016  Laurent et al.
2009/0077543 A1*  3/2009  Siskind ................... G06F 8/447
                                                717/136
(Continued)

FOREIGN PATENT DOCUMENTS

CN          105955921 A       9/2016

OTHER PUBLICATIONS

Daniel, C., van Hoof, H., Peters, J. et al. Probabilistic inference for determining options in reinforcement learning. Mach Learn 104, 337-357 (2016). https://doi.org/10.1007/s10994-016-5580-x (Year: 2016).*

(Continued)

*Primary Examiner* — James D. Rutten
(74) *Attorney, Agent, or Firm* — Kilpatrick Townsend & Stockton LLP

(57) ABSTRACT

A reinforcement learning system comprises an environment (having multiple possible states), and agent, and a policy learner.. The agent is arranged to receive state information indicative of a current environment state and generate an action signal dependent on the state information and a policy associated with the agent, where the action signal is operable to cause an environment-state change. The agent is further arranged to generate experience data dependent on the state information and information conveyed by the action signal. The policy learner is configured to process the experience data in order to update the policy associated with the agent. The reinforcement learning system further comprises a probabilistic model arranged to generate, dependent on the current state of the environment, probabilistic data relating (Continued)

to future states of the environment, and the agent is further arranged to generate the action signal in dependence on the probabilistic data.

7 Claims, 16 Drawing Sheets

(51) Int. Cl.
| | | |
|---|---|---|
| G06F 17/17 | (2006.01) | |
| G06Q 10/04 | (2012.01) | |
| G06Q 50/30 | (2012.01) | |
| G06N 3/08 | (2006.01) | |
| G06Q 10/10 | (2012.01) | |

(52) U.S. Cl.
CPC ............ *G06Q 10/04* (2013.01); *G06Q 50/30* (2013.01); *G06Q 10/10* (2013.01)

(58) Field of Classification Search
USPC .......................................................... 716/12
See application file for complete search history.

(56) References Cited

U.S. PATENT DOCUMENTS

| | | | |
|---|---|---|---|
| 2010/0179930 A1* | 7/2010 | Teller ..................... | G06N 20/00 706/12 |
| 2015/0102945 A1* | 4/2015 | El-Tantawy ........... | G08G 1/081 340/909 |
| 2015/0148919 A1* | 5/2015 | Watson ................. | E21B 43/126 700/31 |
| 2017/0076201 A1 | 3/2017 | van Hasselt et al. | |
| 2018/0202818 A1* | 7/2018 | Zhang ................... | H04W 4/027 |
| 2019/0035088 A1* | 1/2019 | LeGrand ................ | G06T 7/246 |

OTHER PUBLICATIONS

El-Tantawy et al. "Multiagent Reinforcement Learning for Integrated Network of Adaptive Traffic Signal Controllers (MARLIN-ATSC): Methodology and Large-Scale Application on Downtown Toronto," in IEEE Transactions on Intelligent Transportation Systems, vol. 14, No. 3, pp. 114-1150, Sep. 2013 (Year: 2013).*

Miyoung Han, Pierre Senellart, Stéphane Bressan, and Huayu Wu. 2016. Routing an Autonomous Taxi with Reinforcement Learning. In Proceedings of the 25th ACM International on Conference on Information and Knowledge Management (CIKM '16). (Year: 2016).*

S. Rahili, B. Riviere, S. Olivier and S. Chung, "Optimal Routing for Autonomous Taxis using Distributed Reinforcement Learning," 2018 IEEE International Conference on Data Mining Workshops (ICDMW), Singapore, Singapore, 2018, pp. 556-563, doi: 10.1109/ICDMW.2018.00087. (Year: 2018).*

Communication pursuant to Article 94(3) EPC issued from European Patent Office in EP 18 165 197.7 on Apr. 17, 2020.

M. K. Titsias, "Variational Learning of Inducing Variables in Sparse Gaussian Processes", XP055684450, URL:http://proceedings.mlr.press/v5/titsias09a/titsias09a.pdf (2009), retrieved Apr. 8, 2020.

T. N. Hoang et al, "A Unifying Framework of Anytime Sparse Gaussian Process Regression Models with Stochastic Variational Inference for Big Data", XP055684801, http://proceedings.mlr.press/v37/hoang15-supp.pdf (2015), retrieved Apr. 9, 2020.

Edwin V Bonilla et al: "Generic Inference in Latent Gaussian Process Models", XP055684610, https://arxiv.org/pdf/1609.00577v1.pdf (2016).

Andersson et al., "Model-Based Reinforcement Learning in Continuous Environment using real-time constrained optimization", Proceedings of the Twenty-Ninth AAAI Conference on Artificial Intelligence, Jan. 25, 2015, 7 pages.

Engel et al. "Reinforcement learning with Gaussian processes", Proceedings/Twenty-Second International Conference on Machine Learning, Bonn, Germany, Aug. 7-11, 2005, Association for Computing Machinery, NY, Aug. 7, 2005, pp. 201-208, 8 pages.

Hensman et al., "Variational Fourier Features for Gaussian Processes", Retrieved from https://arxiv.org/pdf/1611.06470v1.pdf, dated Nov. 21, 2016, 49 pages.

Tran et al., "The Variational Gaussian Process", Retrieved from https://arxiv.org/pdf/1511.06499v1.pdf, dated Apr. 17, 2016, 14 pages.

Viseras et al., "Decentralized Multi-Agent Exploration with Online-Learning of Gaussian Processes", 2016 IEEE International Conference on Robotics and Automation (ICRA), IEEE, May 16-21, 2016, pp. 4222-4229, 8 pages.

International Search Report and Written Opinion issued in International Application No. PCT/EP2018/077062, dated Jan. 22, 2019, 22 pages.

* cited by examiner

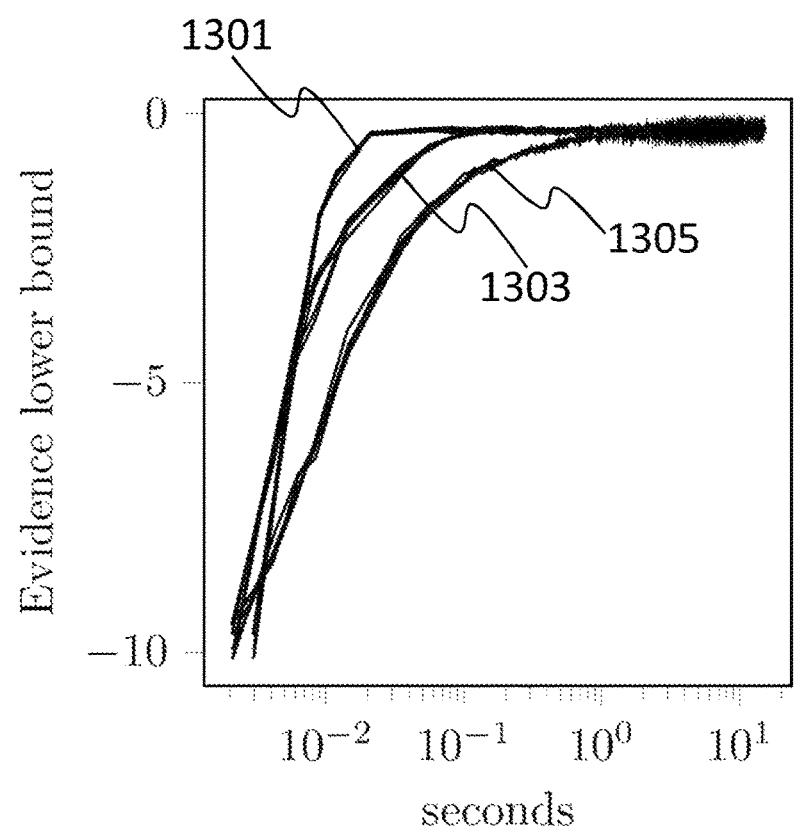
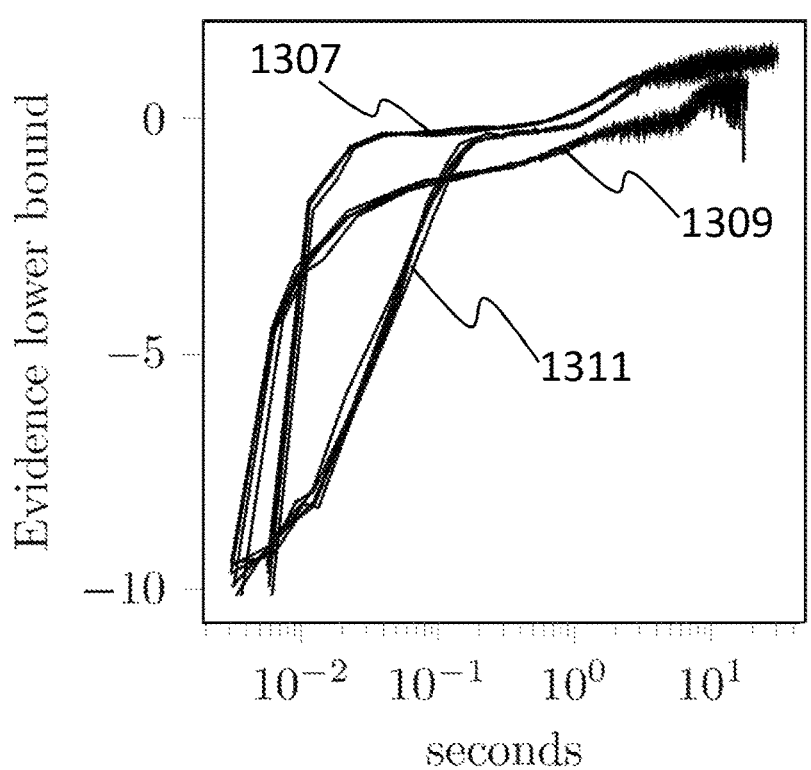
Fig. 13

MACHINE LEARNING SYSTEM

The present application is a continuation application of International Application No. PCT/EP2018/077062, filed on Apr. 10, 2018, which claims priority benefit of European Patent Application Nos. 17275185.1 (filed Nov. 21, 2017) and 18165197.7 (filed Mar. 29, 2018) and also claims priority benefit of Greek Patent Application Nos. 20170100448 (filed Oct. 4, 2017) and 20180100074 (filed Feb. 20, 2018). The entire contents of the aforementioned applications are herein incorporated by reference for all purposes.

TECHNICAL FIELD

This invention is in the field of machine learning systems. One aspect of the invention has particular applicability to generating a probabilistic model for incorporation into a reinforcement learning system.

BACKGROUND

Machine learning involves a computer system learning what to do by analysing data, rather than being explicitly programmed what to do. While machine learning has been investigated for over fifty years, in recent years research into machine learning has intensified. Much of this research has concentrated on what are essentially pattern recognition systems.

In addition to pattern recognition, machine learning can be utilised for decision making. Many uses of such decision making have been put forward, from managing a fleet of taxis to controlling non-playable characters in a computer game. In many examples, the amount and/or quality of available data available to a decision-making system is limited, which presents challenges with regard to the objective of learning optimal decision-making behaviour.

SUMMARY

According to one aspect, there is provided a reinforcement learning system comprising an environment, and agent, and a policy learner. The environment has multiple possible states. The agent is arranged to receive state information indicative of a current state of the environment and to generate an action signal dependent on the state information and a policy associated with the agent, where the action signal is operable to cause a change in a state of the environment. The agent is further arranged to generate experience data dependent on the state information and information conveyed by the action signal. The policy learner is configured to process the experience data in order to update the policy associated with the agent. The reinforcement learning system further comprises a probabilistic model operable to generate, dependent on the current state of the environment, probabilistic data relating to future states of the environment, and the agent is further arranged to generate the action signal in dependence on the probabilistic data.

The probabilistic model may include a stochastic intensity function for associating a stochastic intensity with each point in a domain of the environment, the stochastic intensity indicative of a probability of an event occurring at the point. Accordingly, a further aspect provides a computer-implemented method of generating a distribution of the stochastic intensity function, which also has wider applicability. The method comprises receiving data corresponding to a set of points in the domain, and generating a variational Gaussian process of a latent function dependent on a prior Gaussian process and a plurality of randomly-distributed inducing variables, the inducing variables having a variational distribution and expressible in terms of a plurality of Fourier components. The method further comprises determining, using the data corresponding to the set of points in the domain, a set of parameters for the variational distribution, wherein determining the set of parameters comprises iteratively updating a set of intermediate parameters to determine an optimal value of an objective function, the objective function being dependent on the inducing variables and expressible in terms of the plurality of Fourier components. The method finally comprises determining, from the variational Gaussian process and the determined set of parameters, the distribution of the stochastic intensity function, wherein the distribution of the stochastic intensity function corresponds to a distribution of a quadratic function of the latent function.

BRIEF DESCRIPTION OF THE DRAWINGS

Various embodiments of the invention will now be described with reference to the accompanying figures, in which:

FIG. 13 shows plots demonstrating the convergence of an optimisation objective using various different optimisation methods.

DETAILED DESCRIPTION

Reinforcement Learning: Definitions and Formulation

Figure 1:
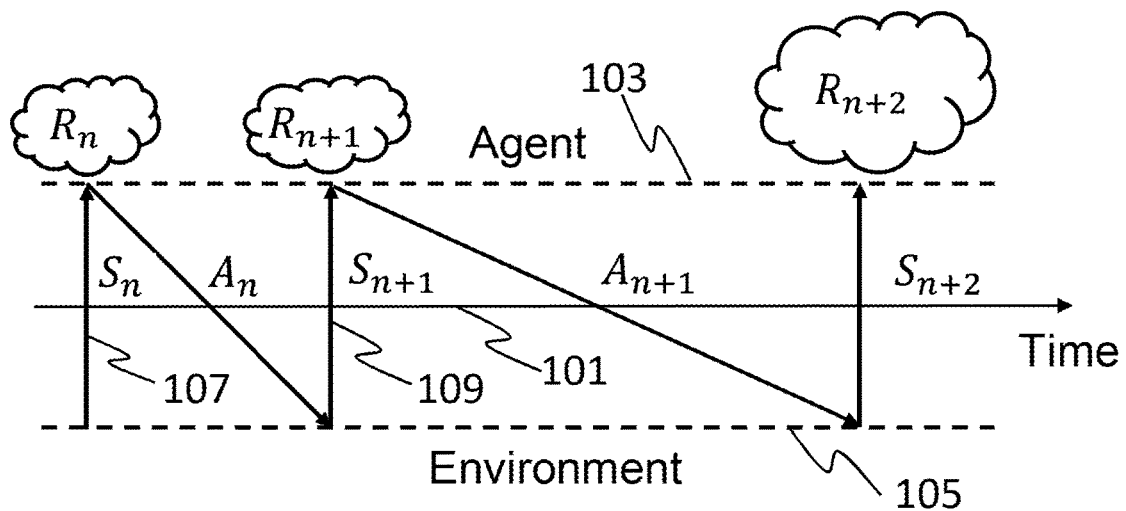
FIG. 1 schematically shows a process in which a single agent interacts with an environment in a reinforcement learning problem.

For the purposes of the following description and accompanying drawings, a reinforcement learning problem is definable by specifying the characteristics of one or more agents and an environment. The methods and systems described herein are applicable to a wide range of reinforcement learning problems, including both continuous and discrete high-dimensional state and action spaces. However, an example of a specific problem, namely managing a fleet of taxis in a city, is referred to frequently for illustrative purposes and by way of example only.

A software agent, referred to hereafter as an agent, is a computer program component that makes decisions based on a set of input signals and performs actions based on these decisions. In some applications of reinforcement learning, each agent is associated with an entity in a physical system. In a first example of managing a fleet of taxis in a city, an agent is assigned to represent each individual taxi in the fleet. In a second example of managing a fleet of taxis, an agent is assigned to each of several subsets of taxis in the fleet. In other applications of reinforcement learning, an agent is not associated with an entity in a physical system. For example, an agent can be assigned to a non-playable character (NPC) in a video game. In some examples in which an agent is associated with an entity in a physical system, the agent may send control signals to the entity. In some examples, an agent is implemented in software or hardware that is part of an associated physical entity (for example, within an autonomous robot). In other examples, an agent is implemented by a computer system that is remote from the physical entity.

An environment is a virtual system with which agents interact, and a complete specification of an environment is referred to as a task. In many practical examples of reinforcement learning, the environment simulates a physical system, defined in terms of information deemed relevant to the specific problem being posed. In the example of managing a fleet of taxis in a city, the environment is a simulated model of the city, defined in terms of information relevant to the problem of managing a fleet of taxis, including for example at least some of: a detailed map of the city; the location of each taxi in the fleet; information representing variations in time of day, weather, and season; the mean income of households in different areas of the city; the opening times of shops, restaurants and bars; and information about traffic.

It is assumed that interactions between an agent and an environment occur at discrete time steps n=0, 1, 2, 3, . . . . The discrete time steps do not necessarily correspond to times separated by fixed intervals. At each time step, the agent receives data corresponding to an observation of the environment and data corresponding to a reward. The data corresponding to an observation of the environment may also include data indicative of probable future states, and the sent data is referred to as a state signal and the observation of the environment is referred to as a state. The state perceived by the agent at time step n is labelled $S_n$. The state observed by the agent may depend on variables associated with the agent itself. For example, in the taxi fleet management problem, the state observed by an agent representing a taxi can depend on the location of the taxi.

In response to receiving a state signal indicating a state $S_n$ at a time step n, an agent is able to select and perform an action $A_n$ from a set of available actions in accordance with a Markov Decision Process (MDP). In some examples, the true state of the environment cannot be ascertained from the state signal, in which case the agent selects and performs the Action $A_n$ in accordance with a Partially-Observable Markov Decision Process (PO-MDP). Performing a selected action generally has an effect on the environment. In examples in which an agent is associated with an entity in a physical system, performing a selected action may correspond to sending a control signal to the entity. Data sent from an agent to the environment as an agent performs an action is referred to as an action signal.

At a later time step n+1, the agent receives a new state signal from the environment indicating a new state $S_{n+1}$. The new state signal may either be initiated by the agent completing the action $A_n$, or in response to a change in the environment. In examples in which the agent is associated with an entity in a physical system, the state signal may include data received from sensors in the physical system. In the example of managing a fleet of taxis, an agent representing a particular taxi may receive a state signal indicating that the taxi has just dropped a passenger at a point A in the city. Examples of available actions are then: to wait for passengers at A; to drive to a different point B; and to drive continuously around a closed loop C of the map. Depending on the configuration of the agents and the environment, the set of states, as well as the set of actions available in each state, may be finite or infinite. The methods and systems described herein are applicable in any of these cases.

Having performed an action $A_n$, an agent receives a reward signal corresponding to a numerical reward $R_{n+1}$, where the reward $R_{n+1}$ depends on the state $S_n$, the action $A_n$ and the state $S_{n+1}$. The agent is thereby associated with a sequence of states, actions and rewards ($S_n$, $A_n$, $R_{n+1}$, $S_{n+1}$, ) referred to as a trajectory T. The reward is a real number that may be positive, negative, or zero. In the example of managing a fleet of taxis in a city, a possible strategy for rewards to be assigned is for an agent representing a taxi to receive a positive reward each time a customer pays a fare, the reward being proportional to the fare. Another possible strategy is for the agent to receive a reward each time a customer is picked up, the value of the reward being dependent on the amount of time that elapses between the customer calling the taxi company and the customer being picked up. An agent in a reinforcement learning problem has an objective of maximising the expectation value of a return, where the value of a return $G_n$ at a time step n depends on the rewards received by the agent at future time steps. For some reinforcement learning problems, the trajectory T is finite, indicating a finite sequence of time steps, and the agent eventually encounters a terminal state $S_T$ from which no further actions are available. In a problem for which T is finite, the finite sequence of time steps refers to an episode and the associated task is referred to as an episodic task. For other reinforcement learning problems, the trajectory T is infinite, and there are no terminal states. A problem for which T is infinite is referred to as an infinite horizon task. Managing a fleet of taxis in a city is an example of a problem having a continuing task. An example of a reinforcement learning problem having an episodic task is an agent learning to play the card game blackjack, in which each round of play is an episode. As an example, a possible definition of the return is given by Equation (1) below:

$$G_n = \sum_{j=0}^{T-n-1} \gamma^j R_{n+j+1}, \quad (1)$$

in which $\gamma$ is a parameter called the discount factor, which satisfies $0 \leq \gamma \leq 1$, with $\gamma=1$ only being permitted if T is finite. Equation (1) states that the return assigned to an agent at time step n is the sum of a series of future rewards received by the agent, where terms in the series are multiplied by increasing powers of the discount factor. Choosing a value for the discount factor affects how much an agent takes into account likely future states when making decisions, relative to the state perceived at the time that the decision is made. Assuming the sequence of rewards $\{R_j\}$ is bounded, the series in Equation (1) is guaranteed to converge. A skilled person will appreciate that this is not the only possible definition of a return. For example, in R-learning algorithms, the return given by Equation (1) is replaced with an infinite sum over undiscounted rewards minus an average expected reward. The applicability of the methods and systems described herein is not limited to the definition of return given by Equation (1).

In response to an agent receiving a state signal, the agent selects an action to perform based on a policy. A policy is a stochastic mapping from states to actions. If an agent follows a policy $\pi$, and receives a state signal at time step n indicating a specific state $S_n=s$, the probability of the agent selecting a specific action $A_n=a$ is denoted by $\pi$ (a|s). A policy for which $\pi_n$(a|s) takes values of either 0 or 1 for all possible combinations of a and s is a deterministic policy. Reinforcement learning algorithms specify how the policy of an agent is altered in response to sequences of states, actions, and rewards that the agent experiences.

The objective of a reinforcement learning algorithm is to find a policy that maximises the expectation value of a return. Two different expectation values are often referred to: the state value and the action value respectively. For a given policy $\pi$, the state value function $v_\pi(s)$ is defined for each state s by the equation $v_\pi(s) = \mathbb{E}_\pi(G_n|S_n=s)$, which states that the state value of state s given policy $\pi$ is the expectation value of the return at time step n, given that at time step n the agent receives a state signal indicating a state $S_n=s$. Similarly, for a given policy $\pi$, the action value function $q_\pi(s, a)$ is defined for each possible state-action pair (s, a) by the equation $q_\pi(s, a) = \mathbb{E}_\pi(G_n|S_n=s, A_n=a)$, which states that the action value of a state-action pair (s, a) given policy $\pi$ is the expectation value of the return at time step t, given that at time step n the agent receives a state signal indicating a state $S_n=s$, and selects an action $A_n=a$. A computation that results in a calculation or approximation of a state value or an action value for a given state or state-action pair is referred to as a backup. A reinforcement learning algorithm generally seeks a policy that maximises either the state value function or the action value function for all possible states or state-action pairs. In many practical applications of reinforcement learning, the number of possible states or state-action pairs is very large or infinite, in which case it is necessary to approximate the state value function or the action value function based on sequences of states, actions, and rewards experienced by the agent. For such cases, approximate value functions $\hat{v}(s, w)$ and $\hat{q}(s, a, w)$ are introduced to approximate the value functions $v_\pi(s)$ and $q_\pi(s, a)$ respectively, in which w is a vector of parameters defining the approximate functions. Reinforcement learning algorithms then adjust the parameter vector w in order to minimise an error (for example a root-mean-square error) between the approximate value functions $\hat{v}(s, w)$ or $\hat{q}(s, a, w)$ and the value functions $v_\pi(s)$ or $q_\pi(s, a)$.

In many reinforcement learning algorithms (referred to as action-value methods), a policy is defined in terms of approximate value functions. For example, an agent following a greedy policy always selects an action that maximises an approximate value function. An agent following an $\varepsilon$-greedy policy instead selects, with probability $1-\varepsilon$, an action that maximises an approximate value function, and otherwise selects an action randomly, where $\varepsilon$ is a parameter satisfying $0<\varepsilon<1$. Other reinforcement learning algorithms (for example actor-critic methods) represent the policy $\pi$ without explicit reference to an approximate value function. In such methods, the policy $\pi$ is represented by a separate data structure. It will be appreciated that many further techniques can be implemented in reinforcement learning algorithms, for example bounded rationality or count-based exploration.

FIG. 1 illustrates an example of a single agent interacting with an environment. The horizontal axis 101 represents increasing time, the dashed line 103 above the axis 101 represents the agent, and the dashed line 105 below the axis 101 represents the environment. At time step n, the agent receives a first state signal 107 from the environment, indicating a state $S_n$, and the agent receives an associated reward $R_n$ associated with the state $S_n$. In response to receiving the first state signal 107, the agent selects an action $A_n$ in accordance with a policy $\pi$, and performs the action $A_n$. The action $A_n$ has an effect on the environment, and is completed at time step n+1. Immediately after the action $A_n$ has been performed, the environment sends a new state signal 109 to the agent, indicating a new state $S_{n+1}$. The new state $S_{n+1}$ is associated with a reward $R_{n+1}$. The agent then performs an action $A_{n+1}$, leading to a state $S_{n+2}$ associated with a reward $R_{n+2}$. As shown in FIG. 1, the interval between time steps n+1 and n+2 does not need to be the same as the interval between time steps n and n+1, and the reward $R_{n+2}$ does not need to be the same as the rewards $R_{n+1}$ or $R_n$.

A range of reinforcement learning algorithms are well-known, and different algorithms may be suitable depending on characteristics of the environment and the agents that define a reinforcement learning problem. Examples of reinforcement learning algorithms include dynamic programming methods, Monte Carlo methods, and temporal difference learning methods, including actor-critic methods. The present application introduces systems and methods that facilitate the implementation of both existing and future reinforcement learning algorithms in cases of problems involving large or infinite numbers of states, and/or having multiple agents, that would otherwise be intractable using existing computing hardware.

Multi-Agent Systems

Figure 2:
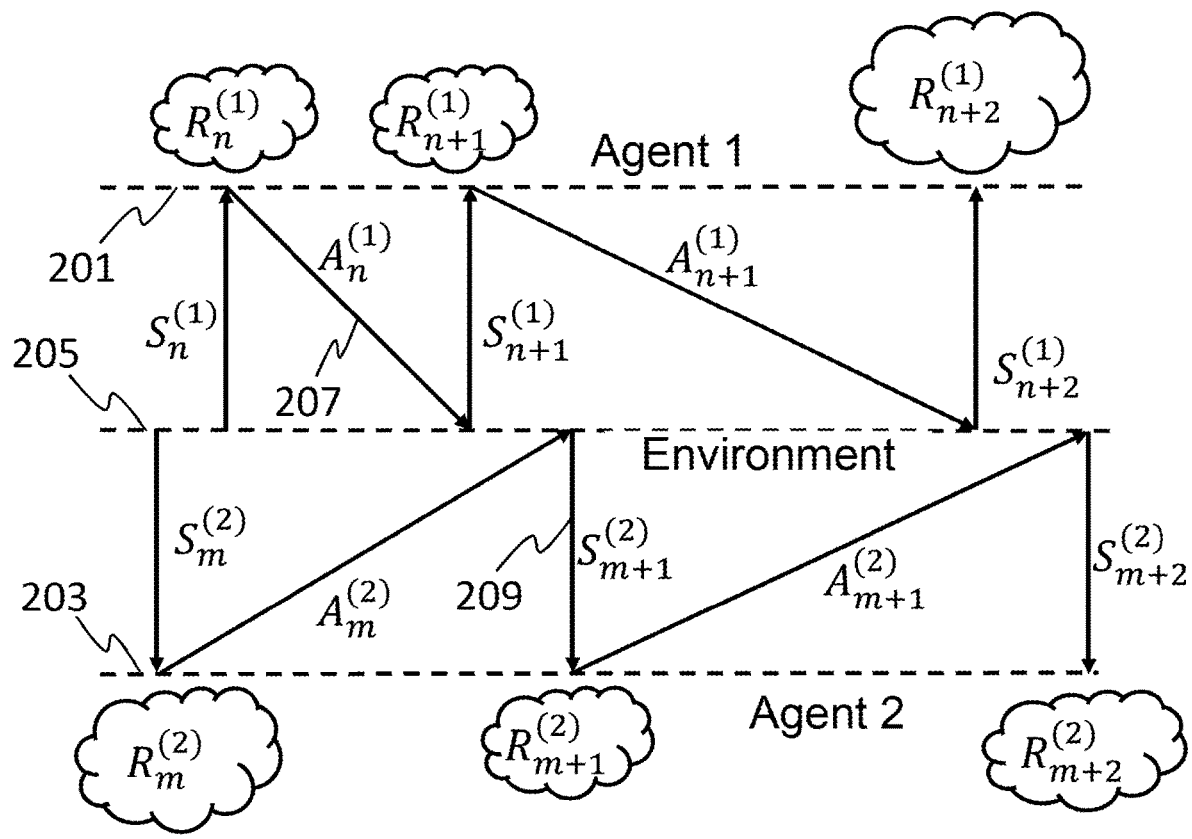
FIG. 2 schematically shows a process in which two autonomous agents interact with an environment in a reinforcement learning problem.

Systems and methods in accordance with the present invention are particularly advantageous in cases in which more than one agent interacts with an environment. The example of managing a fleet of taxis in a city is likely to involve many agents. FIG. 2 illustrates an example in which two agents interact with an environment. As in FIG. 1, time increases from left to right. The top dashed line 201 represents Agent 1, the bottom dashed line 203 represents Agent 2, and the middle dashed line 205 represents the environment. Agent 1 has a trajectory $(S_n^{(1)}, A_n^{(1)}, R_{n+1}^{(1)}, \ldots)$, and Agent 2 has a trajectory $(S_m^{(2)}, A_m^{(2)}, R_{m+1}^{(2)}, \ldots)$ and in this example the set of time steps at which Agent 1 receives state signals is different from the set of time steps at which Agent 2 receives state signals. In this example, the agents do not send signals directly to each other, but instead interact indirectly via the environment (although in other examples signals can be sent directly between agents). For example, the action $A_n^{(1)}$, performed by Agent 1 and represented by arrow 207 has an effect on the environment that alters the information conveyed by state signal 209, indicating a state $S_{m+1}^{(2)}$ to Agent 2. In an example in which FIG. 2 represents two competing taxis in a small town, a first taxi being represented by Agent 1 and a second taxi being represented by Agent 2, the action $A_n^{(1)}$ represent the first taxi driving to a taxi rank in the town in order to seek customers. The action $A_m^{(2)}$ may represent the second taxi driving to the taxi rank from a different part of the town. When the second taxi reaches the taxi rank, Agent 2 receives a state signal indicating a state $S_{m+1}^{(2)}$ in which the first taxi is already waiting at the taxi rank. Agent 2 receives a negative reward $R_{m+2}^{(2)}$ because a state in which the first taxi is already waiting at the taxi rank is not a favourable result for Agent 2. Agent 2 then makes a decision to take action $S_{m+1}^{(2)}$, causing the second taxi to drive to a different taxi rank.

Figure 3:
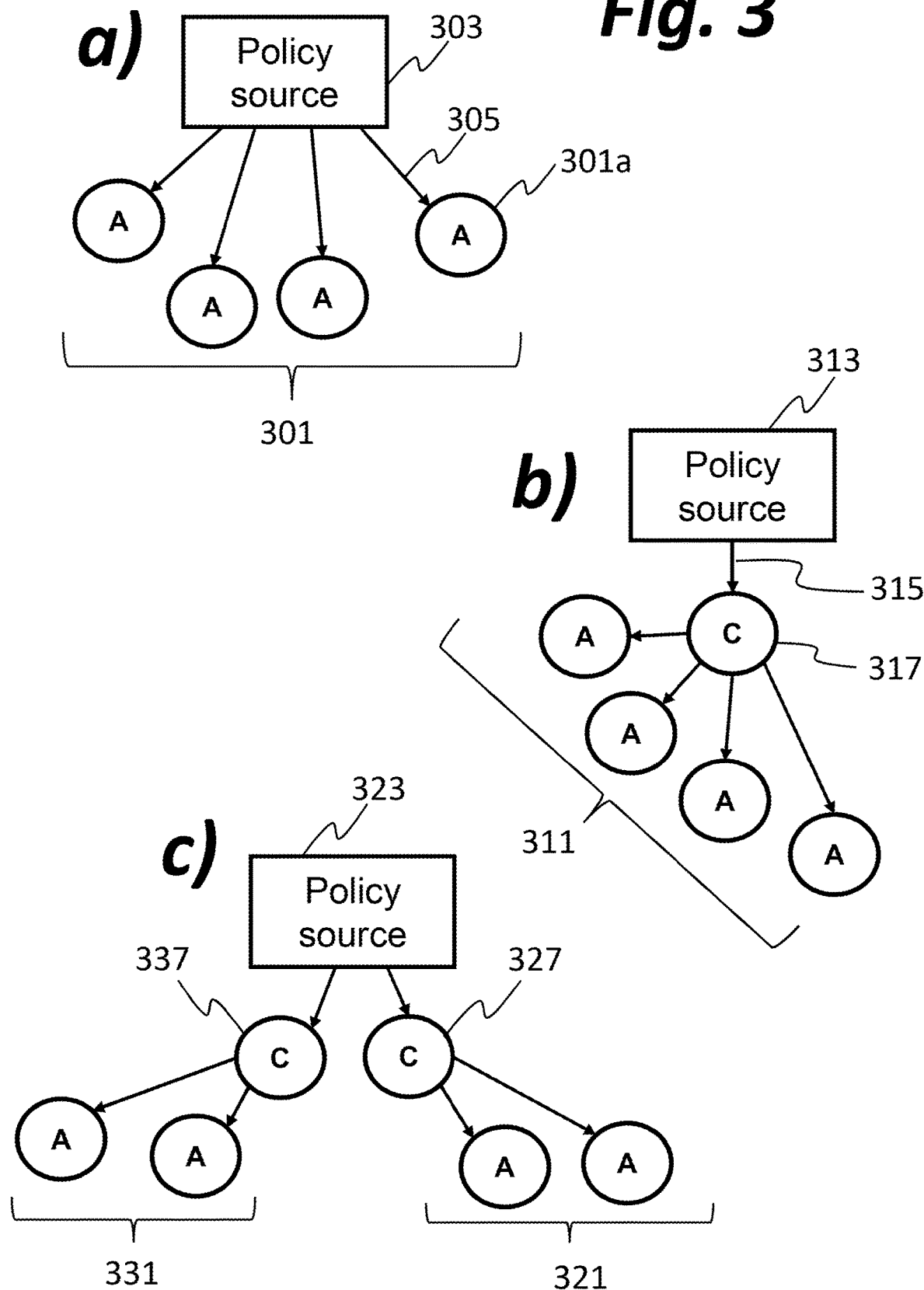
FIG. 3 is a schematic diagram showing examples of policy updates for three different configurations of agents.

In the example of FIG. 2, the two agents Agent 1 and Agent 2 act autonomously such that each agent makes decisions independently of the other agent, and the agents interact indirectly via the effect each agent has on the environment. Each agent selects actions according a policy that is distinct from the policy of each other agent. In the example of FIG. 3a, four autonomous agents, referred to collectively as agents 301, receive policy data from a data processing component referred to as policy source 303. At a first time, policy source 303 sends policy data 305 to agent 301a, causing the policy of agent 301a to be updated. Similarly, policy source 303 sends policy data to each of the agents 301, causing the policies of the agents 301 to be updated. In some examples, the policies of the agents 301 are updated simultaneously. In other examples, the policies of the agents 301 are updated at different times. The configuration of FIG. 3a is referred to as a decentralised configuration. A skilled person will appreciate that in the case of a decentralised configuration of agents such as that of FIG. 3a, the computing resources necessary to apply a particular reinforcement learning algorithm for each agent, including memory, processing power, and storage, can be arranged to scale proportionally with the number of neighbouring agents. Furthermore, a separate reinforcement learning algorithm can be applied to each agent using a separate processor or processor core, leading to parallelised reinforcement learning.

In the example of FIG. 3b, policy source 313 sends policy data 315 to co-ordinator 317. Co-ordinator 317 is an agent that receives state signals from agents 311 and sends instructions to agents 311 to perform actions. The union of agents 311 and co-ordinator 317 is an example of a composite agent, and the configuration of agents in FIG. 3b is referred to as a centralised configuration. In cases where several agents work together to learn a solution to a problem or to achieve a shared objective (referred to as co-operative problem solving), centralised configurations such as that of FIG. 3b typically achieve better coherence and co-ordination than autonomous agents such as those of FIG. 3a. Coherence describes the quality of a solution to the problem, including the efficiency with which agents use resources in implementing the solution. Co-ordination describes the degree to which agents avoid extraneous activity. For a composite agent having a single co-ordinator, the computational expense of implementing a learning algorithm typically scales exponentially with the number of agents receiving instructions from the co-ordinator. For centralised configurations of agents, a co-ordinator selects actions for each agent included in a corresponding composite agent. In some specific examples, particular states are specified to be "bad states" and it is an objective of the co-ordinator to select combinations of actions to avoid bad states. An example of a bad state in co-operative problem solving is a deadlock state, in which no combination of possible actions exists that advances agents towards a shared objective. In the present application, a novel method, referred to as "correctness by learning", is provided for composite agents, in which a co-ordinator learns to avoid bad states in a particular class of problem.

The example of FIG. 3c includes two composite components, each having a co-ordinator and two agents. Co-ordinator 327 and agents 321 form a first composite agent, and co-ordinator 337 and agents 331 form a second composite agent. The configuration of agents in FIG. 3c is referred to as locally centralised. For co-operative problem solving, a locally centralised configuration typically provides a compromise between: relatively good coherence, relatively good co-ordination, and high computational expense, associated with a centralised configuration; and relatively poor coherence, relatively poor co-ordination, and relatively low computational expense, associated with a decentralised co-ordination. The applicability of methods and systems described herein is not limited to the configurations of agents described above and it is not a concern of the present application to propose novel configurations of agents for reinforcement learning problems. Instead, the present application introduces systems and methods that facilitate the flexible implementation of reinforcement learning algorithms for a wide range of configurations of agents.

In some examples, agents are provided with a capability to send messages to one another. Examples of types of messages that a first agent may send to a second agent are "inform" messages, in which the first agent provides information to the second agent, and "request" messages, in which the first agent requests the second agent to perform an action. A message sent from a first agent to a second agent becomes part of a state signal received by the second agent and, depending on a policy of the second agent, a subsequent action performed by the second agent may depend on information received in the message. For examples in which agents are provided with a capability to send messages to each other, an agent communication language (ACL) is required. An ACL is a standard format for exchange of messages between agents. An example of an ACL is knowledge query and manipulation language (KQML).

For examples in which agents are used for co-operative problem solving, various problem-sharing protocols may be implemented, leading to co-operative distributed problem solving. An example of a well-known problem-sharing protocol is the Contract Net, which includes a process of recognising, announcing, bidding for, awarding, and expediting problems. It is not a concern of the present application to develop problem-sharing protocols.

Agents in a decision-making system may be benevolent, such that all of the agents in the decision-making system share a common objective, or may be fully self-interested where each agent has a dedicated objective, or different groups of autonomous agents may exist with each group of autonomous agents sharing a common objective. For a particular example in which agents are used to model two taxi companies operating in a city, some of the agents represent taxis operated by a first taxi company and other agents represent taxis operated by a second taxi company. In this example, all of the agents are autonomous agents, and agents representing taxis operated by the same taxi company have the capability to send messages to one another. In this example, conflict may arise between agents representing taxis operated by the first taxi company and agents representing taxis operated by the second taxi company.

Different agents may be designed and programmed by different programmers/vendors. In such an arrangement, can learn how to interact with other agents through learning from experience by interacting with these "foreign" agents.

Example System Architecture

Figure 4A:
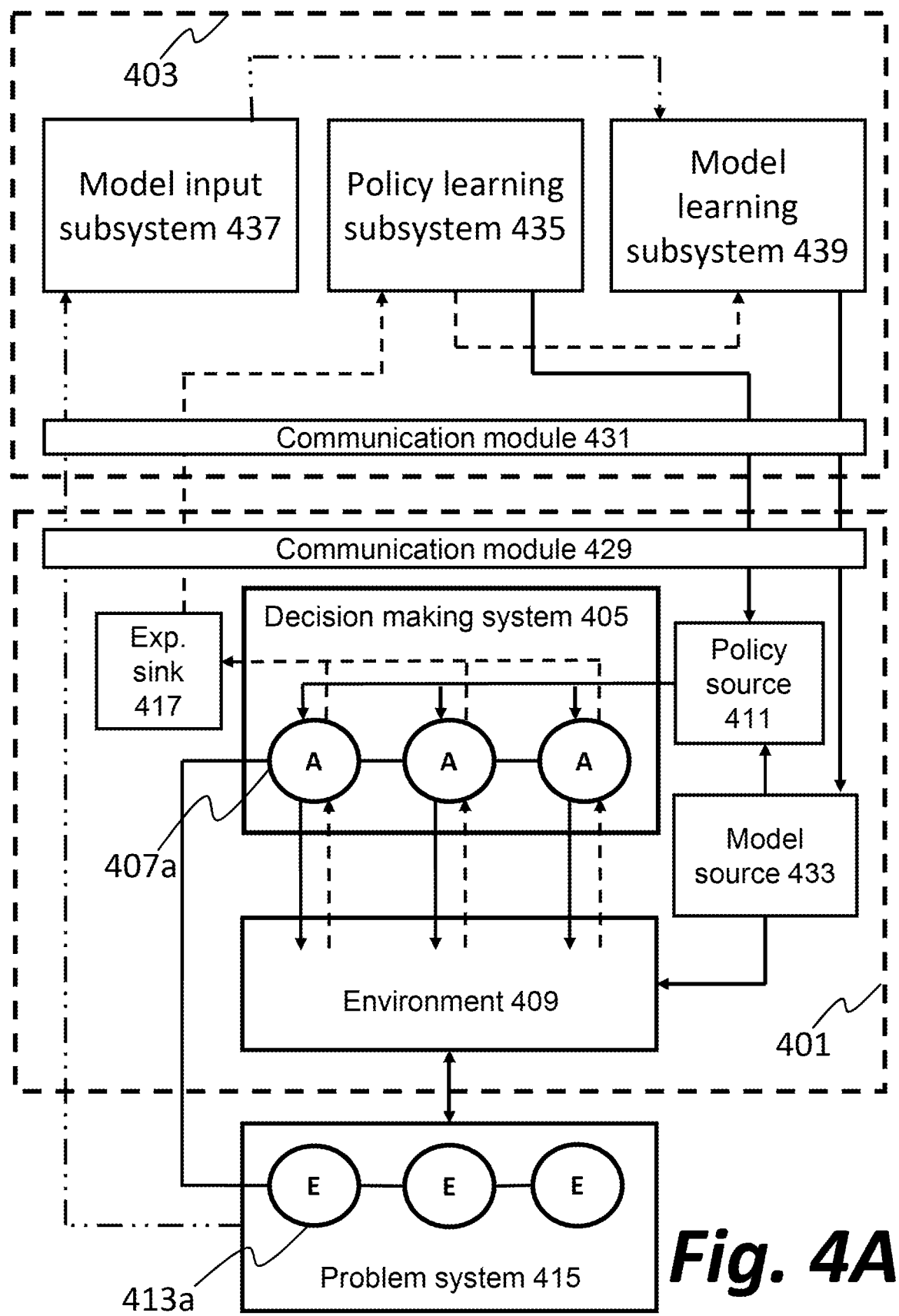
FIG. 4A is a schematic diagram showing the main components of a data processing system according to an embodiment of the invention.

The data processing system of FIG. 4A includes interaction subsystem 401, learning subsystem 403 and problem system 415. Learning subsystem 403 includes policy learning subsystem 435, model input subsystem 437, and model learning subsystem 439. Data is sent between interaction subsystem 401 and learning subsystem 403 via communication module 429 and communication module 431. It is noted that the present arrangement of subsystems is only an example, and other arrangements are possible without departing from the scope of the invention. For example, model input subsystem 437 and model learning subsystem 439 may be combined and/or may be remote from the policy learning subsystem 435. Alternatively, model input subsystem 437 may be incorporated within a subsystem including interaction subsystem 401. Furthermore, any of the subsystems shown in FIG. 4A may be implemented as distributed systems.

Interaction subsystem 401 includes decision making system 405, which comprises N agents, collectively referred to as agents 407, of which only three agents are shown for ease of illustration. Agents 407 perform actions on environment 409 depending on state signals received from environment 409, with the performed actions selected in accordance with policies received from policy source 411. In this example, each of agents 407 represents an entity 413 in problem system 415. Specifically, in this example problem system 415 is a fleet management system for a fleet of taxis in a city, and each entity 413 is a taxi in the fleet. For example, agent 407a represents entity 413a. In this example environment 409 is a dynamic model of the city, defined in terms of information deemed relevant to the problem of managing the fleet of taxis. Specifically, environment 409 is a probabilistic model of the city, as will be described herein. Interaction subsystem 401 also includes experience sink 417, which sends experience data to policy learning subsystem 435. Interaction subsystem 401 further includes model source 433, which provides models to environment 409 and policy source 411.

Figure 4B:
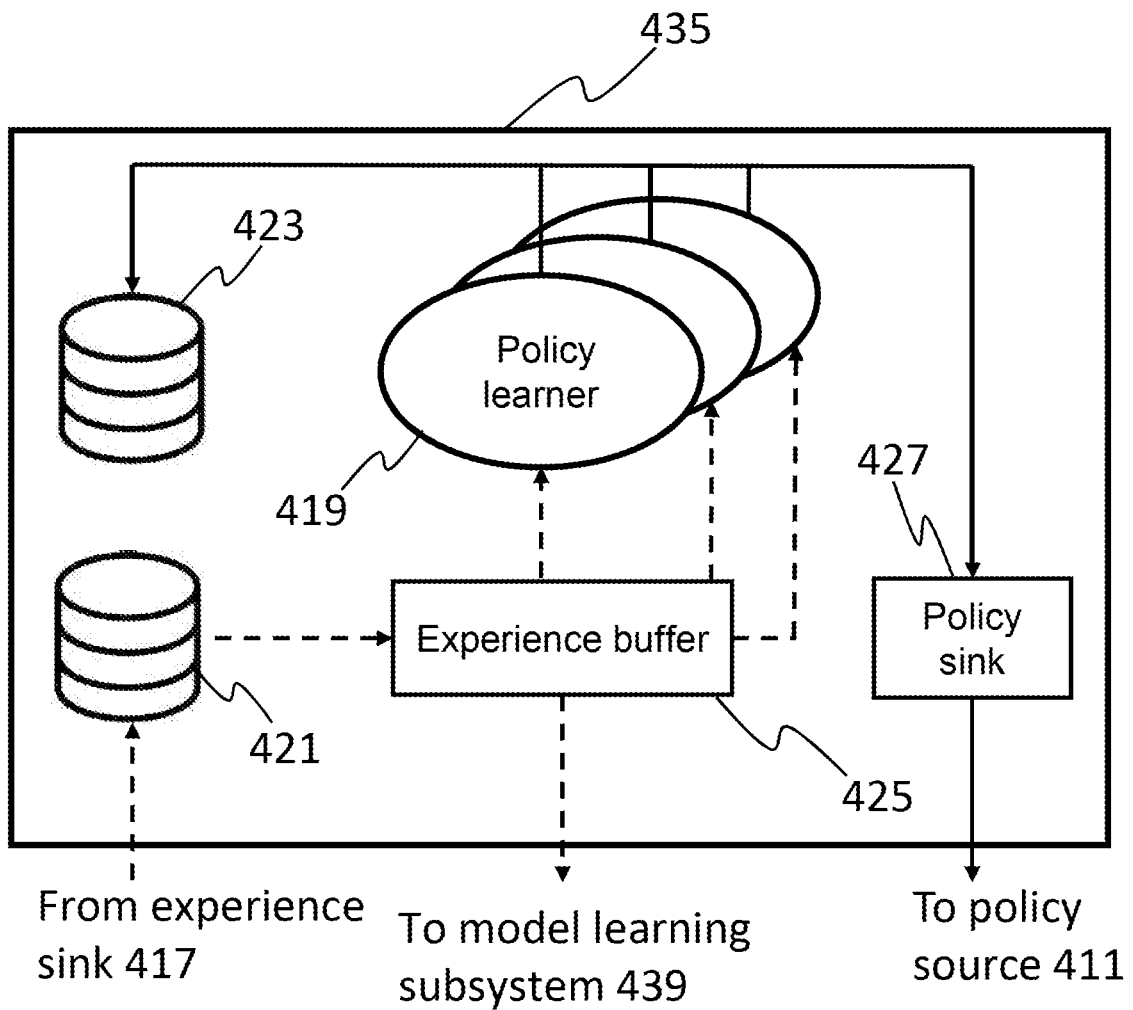
FIG. 4B is a schematic diagram showing the policy learning subsystem of the system of FIG. 4A.

As shown in FIG. 4B, policy learning subsystem 435 includes policy learner 419, which implements one or more learning algorithms to learn policies for agents 407 in the decision making system 405. In a specific example, policy learner 419 includes several deep neural networks (DNNs), as will be described herein. However, the policy learner 419 may implement alternative learning algorithms which do not involve DNNs. Policy learning subsystem 435 also includes two databases: experience database 421 and skill database 423. Experience database 421 stores experience data generated by interaction system 401, referred to as an experience record. Skill database 423 stores policy data generated by policy learner 419. Learning subsystem also includes experience buffer 425, which processes experience data in preparation for the experience data to be sent to policy learner 419, and policy sink 427, which sends policy data generated by policy learner 419 to policy source 411 of interaction subsystem 401.

Figure 4C:
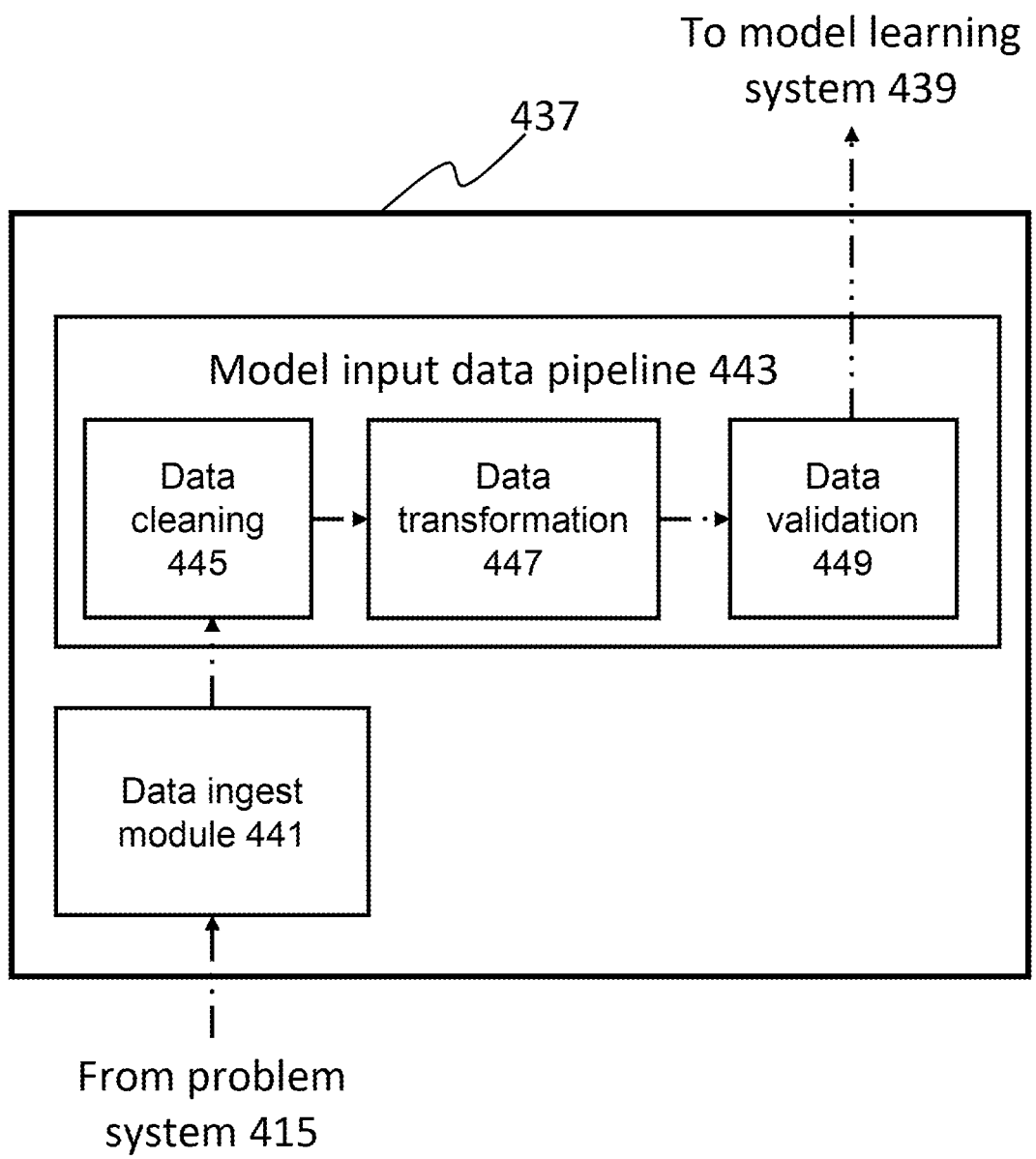
FIG. 4C is a schematic diagram showing the model input subsystem of the system of FIG. 4A.

As shown in FIG. 4C, model input subsystem 437 includes data ingesting module 441, which receives model input data related to problem system 415. Model input data is data input to model learning subsystem 439 in order to generate models of problem system 415. Model input data is distinct from experience data in that model input data is not experienced by agents 407, and is used for learning models of problem system 415, as opposed to being used to learn policies for agents 407. A specific example of learning a model will be described in detail hereafter. In the example of taxi fleet management, model input data may include historic traffic data or historic records of taxi journeys. Model input data may include data indicative of measurements taken by sensors in the problem system 415, for example measurements of weather. Model input subsystem further includes model input data pipeline 443. Model input data pipeline 443 processes model input data and passes the processed model input data to model learning system 439. Model input data pipeline 443 includes data cleaning module 445, data transformation module 447, and data validation module 449. Data cleaning module 445 removes any model input data that cannot be further processed, for example because the model input data includes records that are in a format that is not recognised. Data transformation module 447 transforms or reformats data into a standardised format for further processing. For example, model input data containing dates may be reformatted such that the dates are transformed into a standard format (such as ISO 8601). Data validation module 449 performs a validation process to ensure the data is valid and therefore able to be further processed. For example, if model input data is expected to contain certain fields, or a certain number of fields, the data validation module 449 may check whether the expected fields and/or number of fields appear in the model input data. In some configurations, data validation module 449 may disregard model input data that fails the validation process. In some configurations, data validation module 449 may generate an alert for a human user if model input data fails the validation process.

Figure 4D:
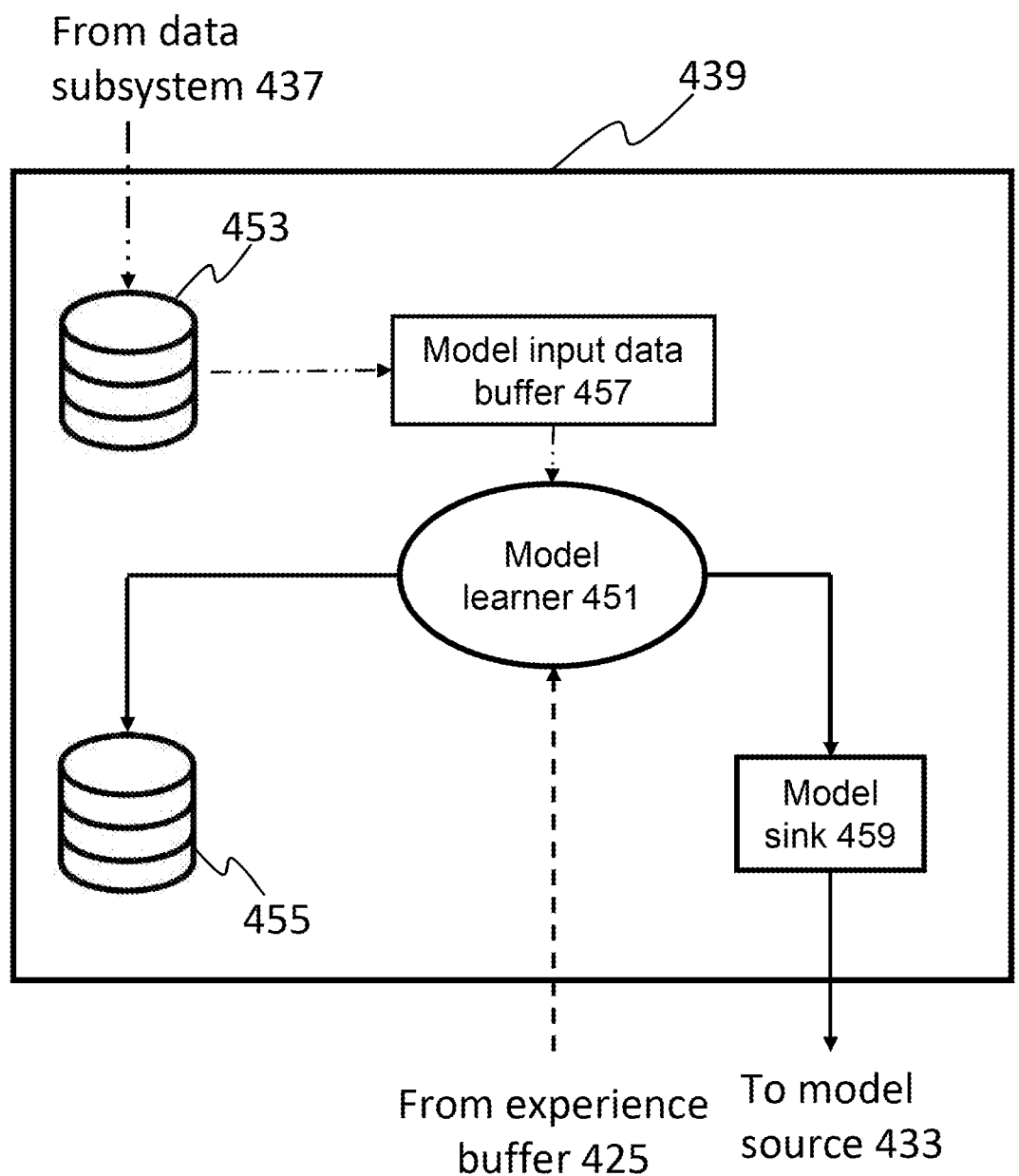
FIG. 4D is a schematic diagram showing the model learning subsystem of the system of FIG. 4A.

As shown in FIG. 4D, model learning subsystem 439 includes model learner 451, which implements one or more learning algorithms to learn models to be incorporated into environment 409 and/or provided to agents 407 within decision making system 405. Model learner 451 is arranged to receive model input data from model input subsystem 437, and further to receive experience data from experience buffer 425. An example of learning a model from model input data for incorporation into an environment will be described in detail hereafter with reference to FIGS. 8 and 9. Model learner 451 may additionally or alternatively learn models for providing to agents 407. For example, model learner 451 may process experience data to learn a model for predicting subsequent states of an environment, given a current state signal and a proposed action. Providing such a model to agents 407 may allow agents 407 to make better decisions. In the example of taxi fleet management, a model may be provided to agents 407 that predicts journey times of taxi trips based on model input data comprising historic taxi records and/or traffic data.

Model learning subsystem 439 includes two databases: model input database 453 and model database 455. Model input database 453 stores model input data received from model input subsystem 437. Model input database 421 may store a large volume of model input data, for example model input data collected from problem system 415 over several months or several years. Model database 455 stores models generated by model learner 451, which may be made available at later times, for example for incorporation into environment 409 or to be provided to agents 407. Model learning subsystem 439 also includes model input data buffer 457, which processes model input data in preparation for the model input data to be sent to model learner 451. In certain configurations, model input data buffer 457 splits model input data into training data which model learner 451 uses to learn models, and testing data which is used to verify that models learned by model learner 451 make accurate predictions. Model learning subsystem also includes model sink 459, which sends models generated by model learner 451 to model source 433 of interaction sub system 401.

Interaction subsystem 401 includes communication module 429 and learning subsystem 403 includes communication module 431. Data is sent between interaction subsystem 401 and learning subsystem 403 via communication module 429 and communication module 431.

In the example of the problem system 415 being a fleet management system, interaction subsystem 401 is a connected to the fleet management system and learning subsystem 403 is remote from the fleet management system and from interaction subsystem 401. Communication module 429 and communication module 431 are interconnected via network interfaces to a communications network (not shown). More specifically, in this example the network is the Internet, learning subsystem 403 includes several remote servers connected to the Internet, and interaction subsystem 401 includes a local server. Learning subsystem 403 and interaction subsystem 401 interact via an application programming interface (API).

Figure 5:
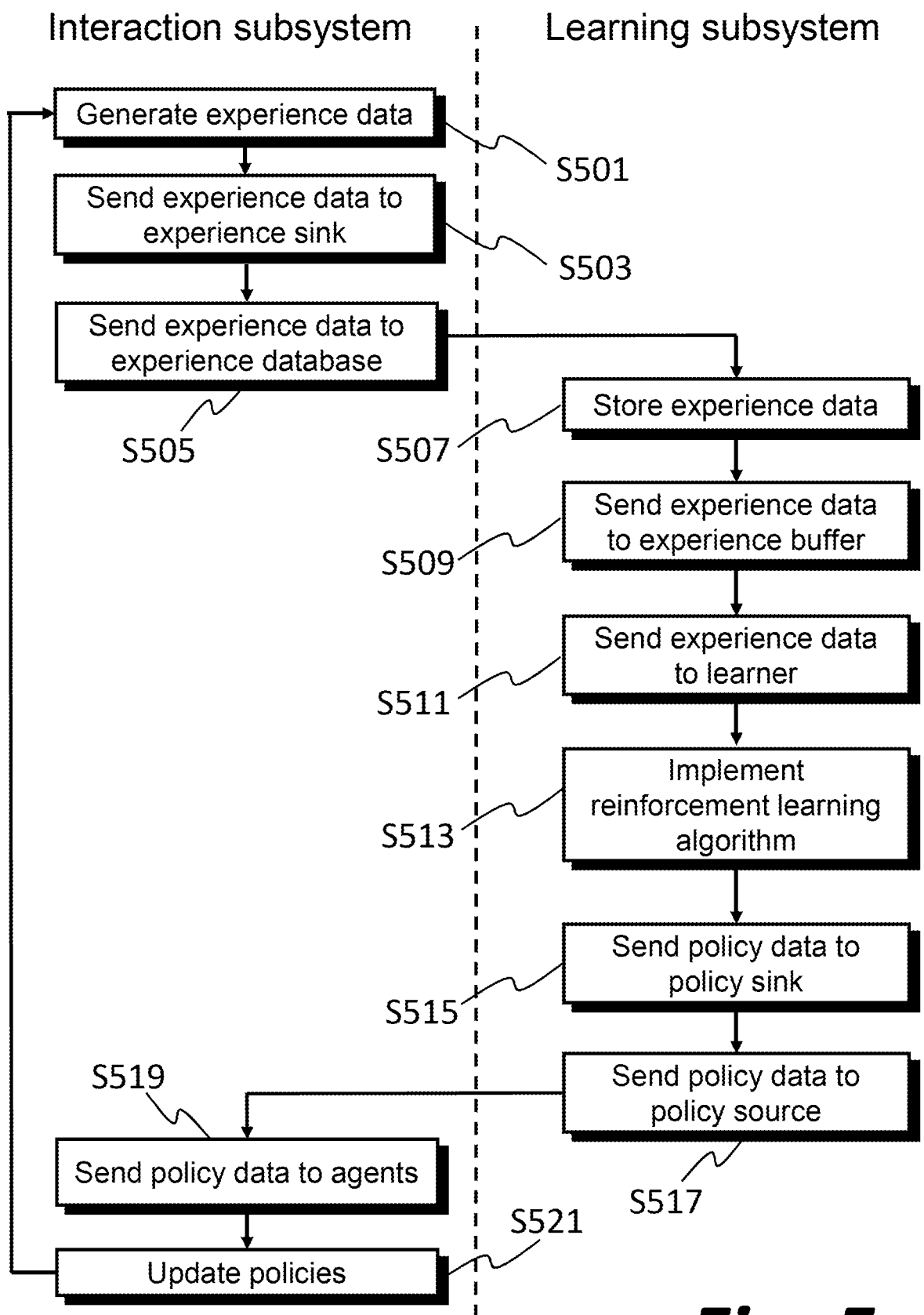
FIG. 5 is a flow diagram representing operations of the data processing system of FIG. 4A.

As shown in FIG. 5, during a reinforcement learning operation, each of the agents 407 generates, at S501, experience data corresponding to an associated trajectory consisting of successive triplets of state-action pairs and rewards. For example, agent 407a, which is labelled i=1, generates experience data corresponding to a trajectory including a sequence of tuples $(S_n^{(1)}, A_n^{(1)}, R_{n+1}^{(1)}, S_{n+1}^{(1)})$ for n=1, 2, . . . , ∞ as the data processing system is in operation. Agents 407 send, at S503, experience data corresponding to sequentially generated tuples $(S_n^{(i)}, A_n^{(i)}, R_{n+1}^{(i)}, S_{n+1}^{(1)})$ for n=1, 2, . . . , ∞; i=1, 2, . . . , N, to experience sink 417. Experience sink 417 transmits, at S505, the experience data to experience database 421 via a communications network. Depending on configuration, experience sink 417 may transmit experience data in response to receiving data from one of the agents 407, or may instead transmit batches of experience data corresponding to several successive state-action-reward tuples. Experience sink 417 may transmit batches of experience data corresponding to each of the agents 407 separately. In the present example, experience sink 417 transmits batches of experience data, each batch corresponding to several state-action-reward tuples corresponding to one of the agents 407. Experience database 421 stores the experience data received from experience sink 417.

Experience database 421 sends, at S509, the experience data to experience buffer 425, which arranges the experience data into an appropriate data stream for processing by policy learner 419. In this example, experience database 421 only stores the experience data until it has been sent to experience buffer 421. Experience buffer 421 sends, at S511, the experience data to policy learner 419. Depending on the configuration of policy learner 419, the experience data may be sent to learner 419 as a continuous stream, or may instead be sent to policy learner 419 in batches. For a specific example in which the agents are arranged in a decentralised configuration similar to that shown in FIG. 3a, the policy learner 419 may include a separate DNN for each of the agents 407. Accordingly, in that specific example, experience buffer 425 sends experience data corresponding to each of the agents 407 to a separate DNN.

Policy learner 419 receives experience data from experience buffer 425 and implements, at S513, a reinforcement learning algorithm. The specific choice of reinforcement learning algorithms implemented by policy learner 419 is selected by a user and may be chosen depending on the nature of a specific reinforcement learning problem. In a specific example, policy learner 419 implements a temporal-difference learning algorithm, and uses supervised-learning function approximation to frame the reinforcement learning problem as a supervised learning problem, in which each backup plays the role of a training example. Supervised-learning function approximation allows a range of well-known gradient descent methods to be utilised by a learner in order to learn approximate value functions $\hat{v}(s, w)$ or $\hat{q}(s, a, w)$. The policy learner 419 may use the backpropagation algorithm for DNNs, in which case the vector of weights w for each DNN is a vector of connection weights in the DNN.

Figure 6:
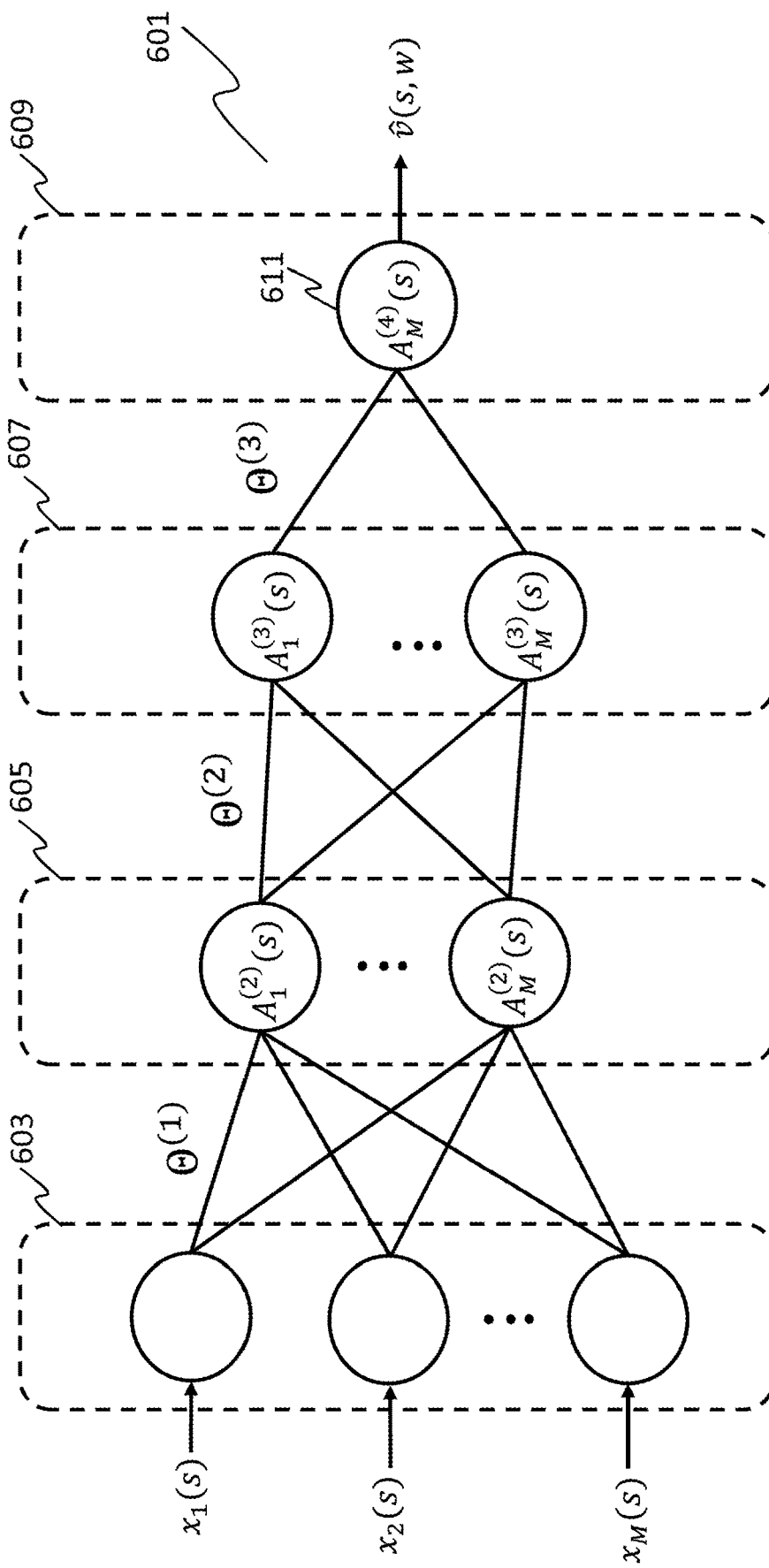
FIG. 6 is a schematic diagram of a deep neural network (DNN) used by in the data processing system of FIG. 4A.

By way of example only, a DNN 601, which can be used by policy learner 419 to learn approximate value functions, will now be described with reference to FIGS. 6 and 7. It is, however, emphasised that other algorithms could be used to generate policy data.

DNN 601 consists of input layer 603, two hidden layers: first hidden layer 605 and second hidden layer 607, and output layer 609. Input layer 603, first hidden layer 605 and second hidden layer 607 each has M neurons and each neuron of input layer 603, first hidden layer 605 and second hidden layer 607 is connected with each neuron in the subsequent layer. The specific arrangement of hidden layers, neurons, and connections is referred to as the architecture of the network. A DNN is any artificial neural network with multiple hidden layers, though the methods described herein may also be implemented using artificial neural networks with one or zero hidden layers. Different architectures may lead to different performance levels for a given task depending on the complexity and nature of the approximate state value function to be learnt. Associated with each set of connections between successive layers is a matrix $\Theta^{(j)}$ for j=1, 2, 3 and for each of these matrices the elements are the connection weights between the neurons in the preceding layer and subsequent layer.

Figure 7:
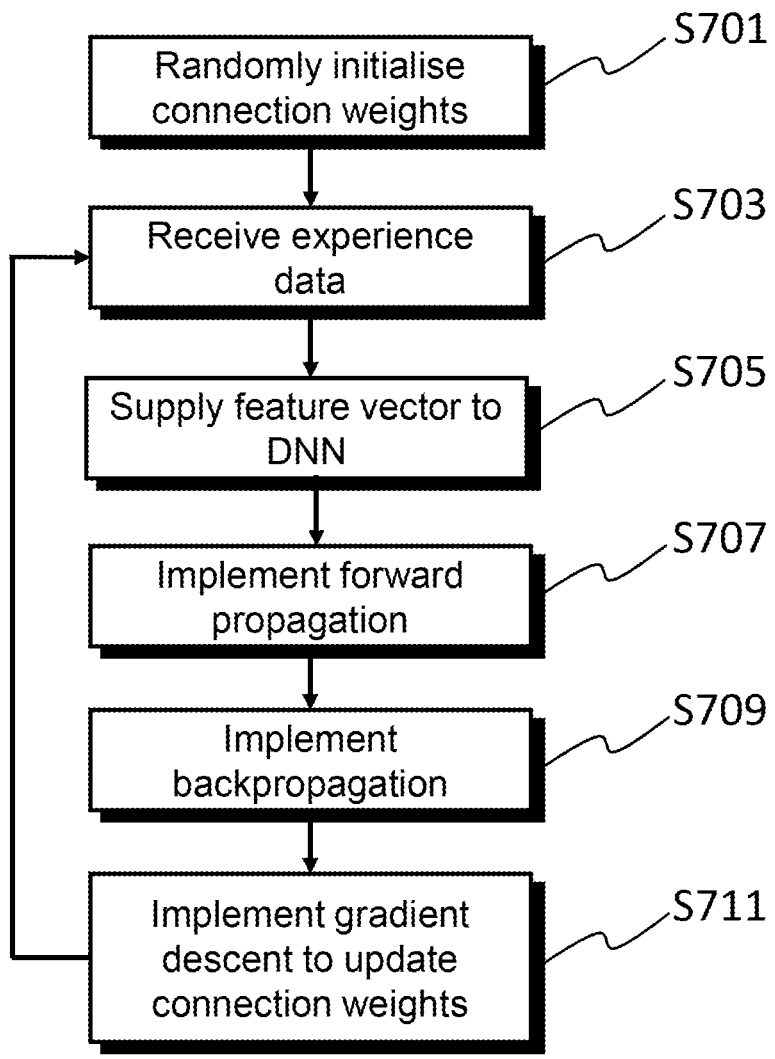
FIG. 7 is a flow diagram showing operations of the DNN of FIG. 6 to learn an approximate state value function.

FIG. 7 describes how policy learner 419 uses DNN 601 to learn an approximate state value function $\hat{v}(s, w)$ in accordance with a temporal difference learning algorithm, given a sequence of backups corresponding to a sequence of states $S_n, S_{n+1}, S_{n+2}, \ldots$ observed by an agent. In this example, the return is given by Equation (1). Policy learner 419 randomly initialises the elements of the matrices $\Theta^{(j)}$ for j=1, 2, 3, at S701, to values in an interval $[-\delta, \delta]$, where δ is a small user-definable parameter. The vector of parameters w contains all of the elements of the matrices $\Theta^{(j)}$ for j=1, 2, 3, unrolled into a single vector.

Policy learner 419 receives, at S703, experience data from experience buffer 425 corresponding to a state $S_n$=s received by an agent at a time step n. The experience data takes the form of a feature vector $q(s)=(q_1(s), q_2(s), \ldots, q_M(s))^T$ with M components (where T denotes the transpose). Each of the M components of the feature vector $q(s)$ is a real number representing an aspect of the state s. In this example, the components of the feature vector $q(s)$ are normalised and scaled as is typical in supervised learning algorithms in order to eliminate spurious effects caused to the output of the learning algorithm by different features inherently varying on different length scales, or being distributed around different mean values. Policy learner 419 supplies, at S705, the M components of $q(s)$ to the M neurons of the input layer 603 of DNN 601.

DNN 601 implements forward propagation, at S707, to calculate an approximate state value function. The components of $q(s)$ are multiplied by the components of the matrix $\Theta^{(1)}$ corresponding to the connections between input layer 603 and first hidden layer 605. Each neuron of first hidden layer 605 computes a real number $A_k^{(2)}(s)=g(z)$, referred to as the activation of the neuron, in which $z=\Sigma_m \Theta_{km}^{(1)} q_m(s)$ is the weighted input of the neuron. The function g is generally nonlinear with respect to its argument and is referred to as the activation function. In this example, g is the sigmoid function. The same process of is repeated for second hidden layer 607 and for output layer 609, where the activations of the neurons in each layer are used as inputs to the activation function to compute the activations of neurons in the subsequent layer. The activation of output neuron 611 is the approximate state value function $\hat{v}(S_n, w_n)$ for state $S_n=s$, given a vector of parameters $w_n$ evaluated at time step n.

Having calculated $\hat{v}(S_n, w_n)$, DNN 601 implements, at S709, the backpropagation algorithm to calculate gradients $\nabla_{w_n} \hat{v}(S_n, w_n)$ with respect to the parameter vector $w_n$. DNN 601 then implements gradient descent, at S711, in parameter space to update the parameters. Gradient descent is implemented in this example by equation (2):

$$w_{n+1} = w_n - \frac{1}{2}\alpha \nabla_{w_n} [V_n(s) - \hat{v}(S_n, w_n)]^2 = \quad (2)$$
$$w_n + \alpha[V_n - \hat{v}(S_n, w_n)]\nabla_{w_n} \hat{v}(S_n, w_n),$$

in which $\alpha$ is a parameter referred to as the learning rate, $V_n(s)$ is an estimate of the state value function $v_\pi(s)$. In this example, the estimate $V_n(s)$ is given by $V_n(s)=R_{n+1}+\gamma \hat{v}(S_{n+1}, w_n)$, and the gradient $\nabla_w \hat{v}(S_n, w_n)$ is augmented using a vector of eligibility traces, as is well-known in temporal difference learning methods. In some examples, other optimisation algorithms are used instead of the gradient descent algorithm given by Equation (2). In some examples, each layer in a neural network include an extra neuron called a bias unit that is not connected to any neuron in the previous layer and has an activation that does not vary during the learning process (for example, bias unit activations may be set to 1). In some examples of reinforcement learning algorithms, a learner computes approximate action value functions $\hat{q}(s, a, w)$, instead of state value functions $\hat{v}(s, w)$. Analogous methods to that described above may be used to compute action value functions.

Referring again to FIG. 5, Policy learner 419 sends, at S515, policy data to policy sink 427. Policy sink 427 sends, at S517, the policy data to policy source 411 via the network. Policy source 411 then sends, at S519, the policy data to agents 407, causing the policies of agents 407 to be updated at S521. Depending on the reinforcement learning algorithm used by learner 419, the policy data may either cause approximate value functions $\hat{v}(s, w)$ or $\hat{q}(s, a, w)$ stored by agents 407 to be updated (for action-value methods), or may instead cause separate data structures representing polices of agents 407 to be updated (for actor-critic methods and other methods in which the policy is stored as a separate data structure). In the example of FIG. 4, an actor-critic method is employed, and therefore agents use the policy data to update data structures that explicitly represent policies. At certain time steps (for example, a time step after which a policy is measured to satisfy a given performance metric), policy learner 419 also sends policy data to skill database 423. Skill database 423 stores a skill library including approximate value functions and/or policies learned during the operation of the data processing system, which can later be provided to agents and/or learners in order to negate the need to relearn the same or similar approximate value functions and/or policies from scratch.

Figure 8:
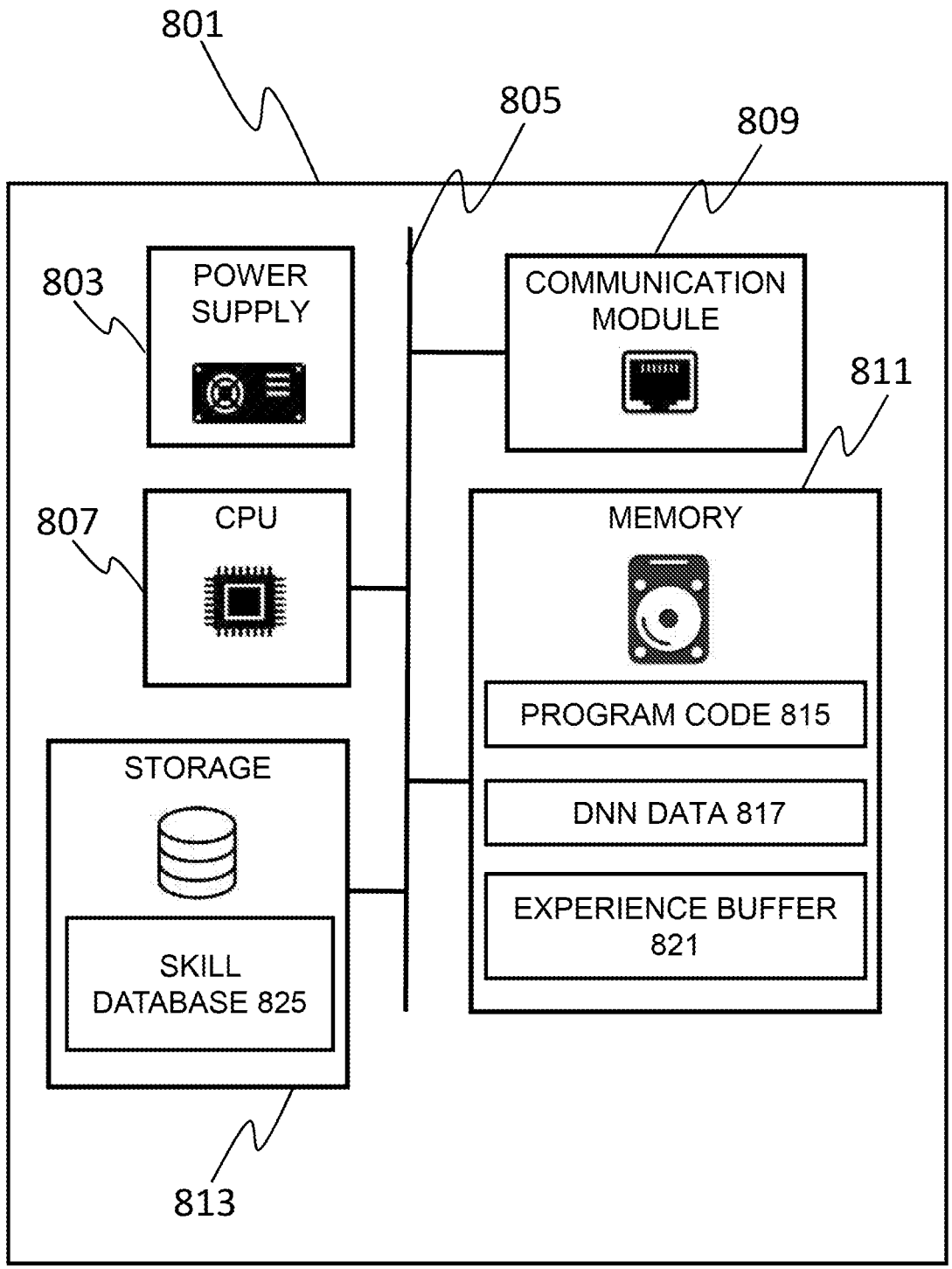
FIG. 8 is a schematic diagram of a server used to implement a learning subsystem in a reinforcement learning system.

FIG. 8 shows server 801 configured to implement a learning subsystem. In this example, the learning subsystem is implemented using a single server, though in other examples the learning subsystem is distributed over several servers as described elsewhere in the present application. Server 801 includes power supply 803 and system bus 805. System bus 805 is connected to: CPU 807; communication module 809; memory 811; and storage 813. Memory 811 stores program code 815; DNN code 817; and experience buffer 821. Storage 813 stores skill database 825. Communication module 809 receives experience data from an interaction subsystem and sends policy data to the interaction subsystem (thus implementing a policy sink).

Figure 9:
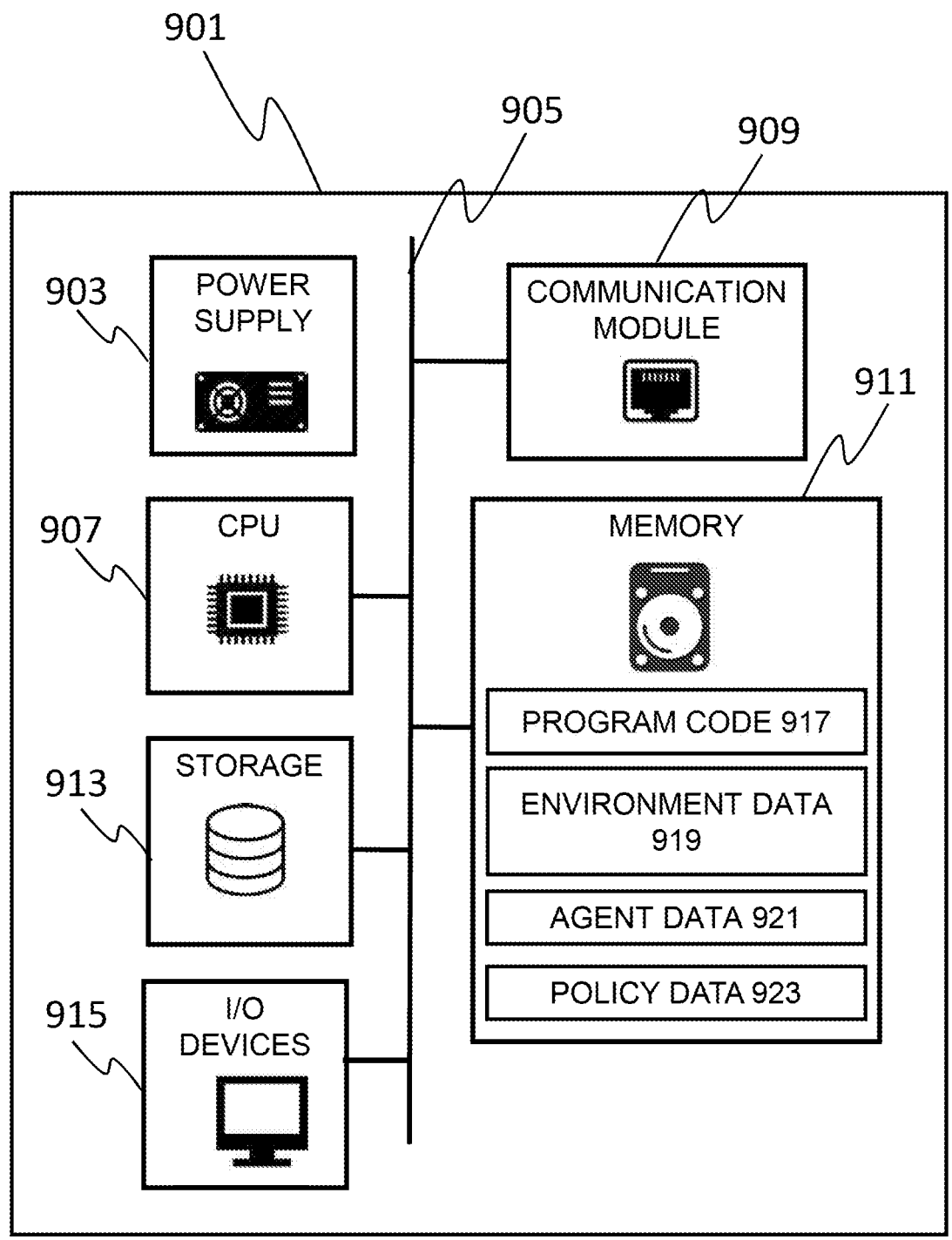
FIG. 9 is a schematic diagram of a user device used to implement an interaction subsystem in a machine learning system.

FIG. 9 shows local computing device 901 configured to implement an interaction subsystem operable to communicate with the server of FIG. 8. Local computing device 901 includes power supply 903 and system bus 905. System bus 905 is connected to: CPU 907; communication module 909; memory 911; storage 913; and input/output (I/O) devices 915. Memory 911 stores program code 917; environment 919; agent data 921; and policy data 923. In this example, I/O devices 915 include a monitor, a keyboard, and a mouse. Communication module 909 receives policy data from server 901 (thus implementing a policy source) and sends experience data to server 901 (thus implementing an experience sink).

The architecture shown in FIG. 4, in which the learning subsystem 403 is remotely hosted and the interaction subsystem 401 is locally hosted, is designed to provide flexibility and scalability for a wide variety of reinforcement learning systems. In many reinforcement learning systems, data is frequently provided to the environment, causing the environment to change. In the example of managing a fleet of taxis in a city, data corresponding to a change such as a change in weather may be provided to environment 409, causing a probabilistic model of environment 409 to change. Furthermore, the state of environment 409 is dependent on action signals received from agents 407. The architecture of FIG. 4 decouples on the one hand the sending of experience data and policy data between the interaction subsystem and the learning subsystem and on the other hand the sending of data between the agents and the environment. In the system of FIG. 4, only experience data and policy data are required to be transferred over the network between learning subsystem 403 and the interaction subsystem 401. Experience data corresponding to states and actions experienced by agents 407 is relatively compact, with state information capable of being reduced to feature vectors (although in some examples all information about a state is included in the experience data so as to be available for analysis by the learning subsystem). Further, the format of experience data is independent on the nature of environment 409 and is specified by the API through which interaction system 401 and learning system 403 interact. It is therefore possible for policy learning subsystem 435 to be agnostic with respect to details of environment 409, which allows flexibility as a range of interaction systems are able to be connected with learning system 403 over the network without making substantial alterations within learning subsystem 403. Policy data is also relatively compact. For example, in the case of an actor-critic method, a scalar signal could be used to transfer policy data from policy learner 419 to each of the agents 407 in order for agents 407 to update policies, although a vector signal or a matrix of values may be used in some examples. The frequency at which experience data and policy data are transferred between policy learning subsystem 435 and interaction subsystem 401 is configurable. For example, in some examples experience data is sent in batches corresponding to a configurable number of time steps. Similarly, in some examples the reinforcement learning algorithm implemented by policy learner 419 works in a batch configuration, such that policy data is sent to interaction system 401 after policy learner 419 has processed experience data corresponding to a configurable number of time steps. In some examples, configuring the batch size as described above is manual, in which case a user selects the size of the batches of experience data. In other examples configuring the batch size is automatic, in which case an optimal batch size is calculated and selected depending on the specific reinforcement learning algorithm and the specific configuration of agents 407 and environment 409. Configuring the batch size provides flexibility and scalability regarding the number of agents 407 and the complexity of environment 409, because in doing so the time scale associated with the learning process performed by policy learning subsystem 435 is decoupled from the time scale associated with time steps in interaction subsystem 401. For large numbers of agents and/or complex environments, the time scale associated with each time step is typically much shorter than the time scale associated with the reinforcement learning process, so configuring an appropriate batch size means that interaction subsystem 403 is able to operate without being slowed down by the reinforcement learning algorithm implemented by learning system 401.

Distributing the processing between a local interaction subsystem and a remote learning subsystem has further advantages. For example, the data processing subsystem can be deployed with the local interaction subsystem utilising the computer hardware of a customer and the learning subsystem utilising hardware of a service provider (which could be located in the "cloud"). In this way, the service provider can make hardware and software upgrades without interrupting the operation of the local interaction subsystem by the customer.

As described herein, reinforcement learning algorithms may be parallelised for autonomous agents, with separate learning processes being carried out by policy learner 419 for each of the agents 407. For systems with large numbers of agents, the system of FIG. 4 allows for policy learning subsystem 435 to be implemented by a distributed computing system. Further, for composite agents such as those described in FIG. 3b or 3c, in which the computational expense of learning algorithms typically scale exponentially with the number of component agents, servers having powerful processors, along with large memory and storage, may be provided. Implementing the learning subsystem using a remote, possibly distributed, system of servers, allows the necessary computing resources to be calculated depending on the configuration of the agents and the complexity of the environment, and for appropriate resources to be allocated to policy learning subsystem 435. Computing resources are thereby allocated efficiently.

Probabilistic Modelling

As stated above, an environment is a virtual system with which agents interact, and the complete specification of the environment is referred to as a task. In some examples, an environment simulates a physical system, defined in terms of information deemed relevant to the specific problem being posed. Some examples of environments in accordance with the present invention include a probabilistic model which can be used to predict future conditions of the environment. In the example architecture of FIG. 4A, the model learner 451 may be arranged to process model input data received from the model input data subsystem 437, and/or experience data received from the experience buffer 425, in order to generate a probabilistic model. The model learner 451 may send the generated probabilistic model to the model source 433 for incorporation into the environment 409. Incorporating a probabilistic model into an environment allows state signals sent from the environment to agents to include information corresponding not only to a prevailing condition of the environment, but also to likely future conditions of the environment.

In an example of managing a fleet of taxis in a city in which a probabilistic model is included in the environment, an agent representing a taxi may receive a state signal indicating that an increase in demand for taxis is likely to occur in a certain region of the city at a given point in the future. In this example, the probabilistic model is used to generate a probability distribution for taxi demand in the city. This allows agents to predict variations in demand and to select actions according to these predictions, rather than simply reacting to observed variations in demand. Further to providing additional state information to agents, in some examples a probabilistic model is used to generate simulation data for use in reinforcement learning. In such examples, the simulation data may be used to simulate states of an environment. Agents may then interact with the simulated states of the environment in order to generate experience data for use by a policy learner to perform reinforcement learning. Such examples make efficient use of data corresponding to observed states of an environment, because a large volume of simulation data can be generated from a limited volume of observed data. In particular, data corresponding to observed states of an environment is likely to be limited in cases where the environment corresponds to a physical system.

It is an objective of the present application to provide a computer-implemented method for implementing a particular type of probabilistic model of a system. The probabilistic model is suitable for incorporation into an environment in a reinforcement learning problem, and therefore the described method further provides a method for implementing a probabilistic model within a reinforcement learning environment for a data processing system such as that shown in FIG. 4. Novel techniques are provided that render the proposed probabilistic model computationally tractable, thereby allowing large scale models for complex environments to be realised. Furthermore, in contrast with known methods of implementing similar types of probabilistic model, the method described herein does not require discretisation of spatial or temporal dimensions within the system, and accordingly does not suffer from numerical artefacts arising from such discretisation, as will be described in detail hereafter. A formal definition of the probabilistic model will now be described.

The present method relates to a type of inhomogeneous Poisson process referred to as a Cox process. For a D-dimensional domain $\chi \subset \mathbb{R}^d$, a Cox process is defined by a stochastic intensity function $\lambda: \chi \to \mathbb{R}^+$, such that for each point x in the domain $\chi$, $\lambda(x)$ is a non-negative real number. A number $N_p(\tau)$ of points found in a sub-region $\tau \subset \chi$ is assumed to be Poisson distributed such that $N_p(\tau) \sim$ Poisson $(\lambda_\tau)$ with a rate parameter $\lambda_\tau = \int_\tau \lambda(x) dx$. The interpretation of the domain $\chi$ and the Poisson-distributed points depends on the system that the model corresponds to. In some examples, a system has spatial and temporal dimensions and the stochastic intensity function relates to the frequency at which events are expected to occur in the system. In the example of managing a fleet of taxis in a city, the domain $\chi$ is three-dimensional, with the first and second dimensions being spatial dimensions, and the third dimension being temporal. Spatial co-ordinates of the points in this example correspond to co-ordinates on a map of the city at which taxis are requested, and the temporal co-ordinates of the points correspond to the times at which the taxis are requested. $N_p(\tau)$ then refers to the number of taxi requests received over a given time interval in a given region of the map. The stochastic intensity function $\lambda(x)$ therefore gives a probabilistic model of taxi demand as a function of time and location in the city. An aim of the present disclosure is to provide a computationally-tractable technique for inferring the stochastic intensity function $\lambda(x)$, given model input data comprising a set of discrete data $X_N = \{x^{(n)}\}_{n=1}^N$ corresponding to a finite set of points in the domain $\chi$, which does not require the domain $\chi$ to be discretised, and accordingly does not suffer from problems associated with discretisation of the domain $\chi$.

In examples where the domain $\chi$ has a temporal dimension, each data point $x^{(n)}$ for n=1, ..., N corresponds to the temporal co-ordinate of an observation of an event occurring in the domain. In examples where the domain x has spatial and temporal dimensions, each data point $x^{(n)}$ for n=1, ..., N corresponds to the spatio-temporal co-ordinates of an observation of an event occurring in the domain. In the example of managing a fleet of taxis in a city, the components of each data point $x^{(n)}$ for n=1, ..., N are indicative of a location and time of an observed taxi request in the city during a fixed interval. In this example, the system is a physical system, and the discrete data correspond to a finite set of observations of events occurring in the physical system. In some examples, the data $X_N$ may further include experience data, for example including locations and times of taxi requests received by the agents 407. The model learner 451 may process this experience data to update the probabilistic model as the experience data is generated. For example, the model learner 451 may update the probabilistic model after a batch of experience data of a predetermined size has been generated by the agents 407.

Other examples of physical systems that may be modelled using a Cox process include smart cities. In one such example, discrete data points corresponds to parcel deliveries in a city, and a stochastic intensity function gives a probabilistic model of the demand for parcel deliveries in the city, which may be used by an operator of a parcel delivery force to allocate resources efficiently.

Another example in which a Cox process may be used is in modelling the spread of disease in a geographical region. In this example, discrete data points correspond to instances of a disease being detected, and a stochastic intensity function gives a probabilistic model of the spread of the disease in the region.

Another example of a physical system in which a Cox process may be used is in modelling unauthorised border crossings into a country. In this example, discrete data points correspond to detections of unauthorised border crossings by sensors located along a section of a national border. A stochastic intensity function then gives a probabilistic model of unauthorised border crossings, which may be used by a government authority to decide where to locate detectors in order to maximise the probability of detecting future unauthorised border crossings, allowing the government authority to intervene accordingly.

Other examples of physical systems that may be modelled using a Cox process include rare particle events in a particle accelerator. In one such example, discrete data points correspond to particle events detected by a sensor in the accelerator, and a stochastic intensity function gives a probabilistic model of particle events in the accelerator.

Other examples of physical systems that may be modelled using a Cox process include rare cosmic events, such as supernovae. In such examples, discrete data points correspond to detected occurrences of rare cosmic events by telescopes. In such examples, a stochastic intensity function gives a probabilistic model of the rare cosmic events. In a machine learning context, an agent may then be associated with an automated telescope, such that the agent receives data dependent on the probabilistic model and hence generates an action signal that relates to the probability of cosmic events being observed in the future. The agent may then send a control signal, corresponding to the action signal, to the automated telescope, such that the telescope may be focus on particular regions of space at particular times in order to maximise the probability of further rare cosmic events being observed.

In other examples, discrete data points correspond to rare cosmic particle events. In one example, discrete data points correspond to detections of neutrinos by a neutrino detector, and a stochastic intensity function gives a probabilistic model of the frequency of neutrinos arriving at the detector.

In an example in which the probabilistic model is used to generate simulation data for use in reinforcement learning, discrete data points corresponding to simulated events (for example, discrete data points corresponding the locations and times of simulated taxi requests in the example of managing a fleet of taxis) are generated according to the Cox process using inferred stochastic intensity function $\lambda(x)$, and these discrete data points may then be used to generate simulated states of an environment. Agents may then interact with the simulated states of the environment in order to generate experience data for a reinforcement learning system.

The present method is an example of a Bayesian inference scheme. Such schemes are based on the application of Bayes' theorem in a form such as that of Equation (3):

$$p(\lambda(x) \mid X_N) = \frac{p(X_N \mid \lambda(x))p(\lambda(x))}{p(X_N)}, \qquad (3)$$

in which:
   $p(\lambda(x)|X_N)$ is a posterior probability distribution of the function $\lambda(x)$ conditioned on the data $X_N$;

$p(X_N|\lambda(x))$ is a probability distribution of the data $X_N$ conditioned on the function $\lambda(x)$, referred to as the likelihood of $\lambda(x)$ given the data $X_N$;

$p(\lambda(x))$ is a prior probability distribution of functions $\lambda(x)$ assumed in the model, also referred to simply as a prior; and $p(X_N)$ is the marginal likelihood, which is calculated by marginalising the likelihood over functions $\lambda(x)$ in the prior distribution, such that $p(X_N) = \int p(X_N|\lambda(x))p(\lambda(x))d\lambda$.

For the Cox process described above, the likelihood of $\lambda(x)$ given the data $X_N$ is given by Equation (4):

$$p(X_N | \lambda(x)) = \exp\left(-\int_\tau \lambda(x)dx\right)\prod_{n=1}^{N} \lambda(x^{(n)}), \quad (4)$$

which is substituted into Equation (3) to give Equation (5):

$$p(\lambda(x) | X_N) = \frac{\exp\left(-\int_\tau \lambda(x)dx\right)\prod_{n=1}^{N} \lambda(x^{(n)})p(\lambda(x))}{\int p(\lambda(x))\exp(-\int_\tau \lambda(x)dx)\prod_{n=1}^{N} \lambda(x^{(n)})d\lambda}. \quad (5)$$

In principle, the inference problem is solved by calculating the posterior probability distribution using Equation (5). In practice, calculating the posterior probability distribution using Equation (5) is not straightforward. First, it is necessary to provide information about the prior distribution $p(\lambda(x))$. This is a feature of all Bayesian inference schemes and various methods have been developed for providing such information. For example, some methods include specifying a form of the function to be inferred ($\lambda(x)$ in the case of Equation (5)), which includes a number of parameters to be determined. For such methods, Equation (5) then results in a probability distribution over the parameters of the function to be inferred. Other methods do not include explicitly specifying a form for the function to be inferred, and instead assumptions are made directly about the prior probability distribution. A second reason that calculating the posterior probability distribution using Equation (5) is not straightforward is that computing the nested integral in the denominator of Equation (5) is very computationally expensive, and the time taken for the inference problem to be solved for many methods therefore becomes prohibitive if the number of dimensions D and/or the number of data points N is large (the nested integral is said to be doubly-intractable).

The doubly-intractable integral of Equation (5) is particularly problematic for cases in which the probabilistic model is incorporated into an environment for a reinforcement learning problem, in which one of the dimensions is typically time, and therefore the integral over the region i involves an integral over a history of the environment. Known methods for approaching problems involving doubly-intractable integrals of the kind appearing in Equation (5) typically involve discretising the domain $\tau$, for example using a regular grid, in order to pose a tractable approximate problem (see, for example, Rue et al, "Approximate Bayesian inference for latent Gaussian models by using integrated nested Laplace approximations", *J. R. Statist. Soc. B* (2009)). Such methods thereby circumvent the double intractability of the underlying problem, but suffer from sensitivity to the choice of discretisation, particularly in cases where the data points are not located on the discretising grid. It is noted that, for high-dimensional examples, or examples with large numbers of data points, the computational cost associated with a fine discretisation of the domain quickly becomes prohibitive, preventing such methods from being applicable in many practical situations.

The present method provides a novel approach to address the difficulties mentioned above such that the posterior $p(\lambda(x)|X_N)$ given above by Equation (5) is approximated with a relatively low computational cost (in terms of floating point operations to be performed), even for large numbers N of data points. Furthermore, the present method does not involve any discretisation of the domain $\tau$, and therefore does not suffer from the associated sensitivity to the choice of grid or prohibitive computational cost. The method therefore provides a tractable method for providing a probabilistic model for incorporation into an environment for a reinforcement learning problem. Broadly, the method involves two steps: first, the stochastic intensity function $\lambda(x)$ is assumed to be related to a random latent function $f(x)$ that is distributed according to a Gaussian process. Second, a variational approach is applied to construct a Gaussian process $q(f(x))$ that approximates a posterior distribution $p(f(x)|X_N)$. As will be described in more detail hereafter, the posterior Gaussian process is chosen to have a form based on a set of Fourier components, where the number of Fourier components is used to control a bias related to a characteristic length scale of inferred functions in the posterior Gaussian process. In particular, the form chosen for the posterior Gaussian process results in the variational approach being tractable, and implemented with a relatively low computational cost in terms of the necessary number of floating point operations to be performed.

In the present method, the stochastic intensity function $\lambda(x)$ is assumed to be given by a quadratic function of the latent function $\lambda(x)$. In a first example, the stochastic intensity function $\lambda(x)$ is given by the square of the latent function $f(x)$, such that $\lambda(x) \equiv [f(x)]^2$. The skilled person will appreciate that the posterior distribution of $\lambda(x)$ conditioned on the data $X_N$ is readily computed if the posterior distribution of $f(x)$ conditioned on the data $X_N$ is determined (or approximated). Defining the latent function $f(x)$ in this way permits a Gaussian process approximation to be applied, in which a prior distribution $p(f(x))$ is constructed by treating $f(x)$ as a random function distributed according to a Gaussian process. In the following section, the present method will be described for the one-dimensional case D=1, and extensions to D>1, which are straightforward extensions of the D=1 case, will be described thereafter.

Variational Gaussian Process Method in one Dimension

The following section describes a method of providing a probabilistic model in accordance with an aspect of the present invention.

Figure 10:
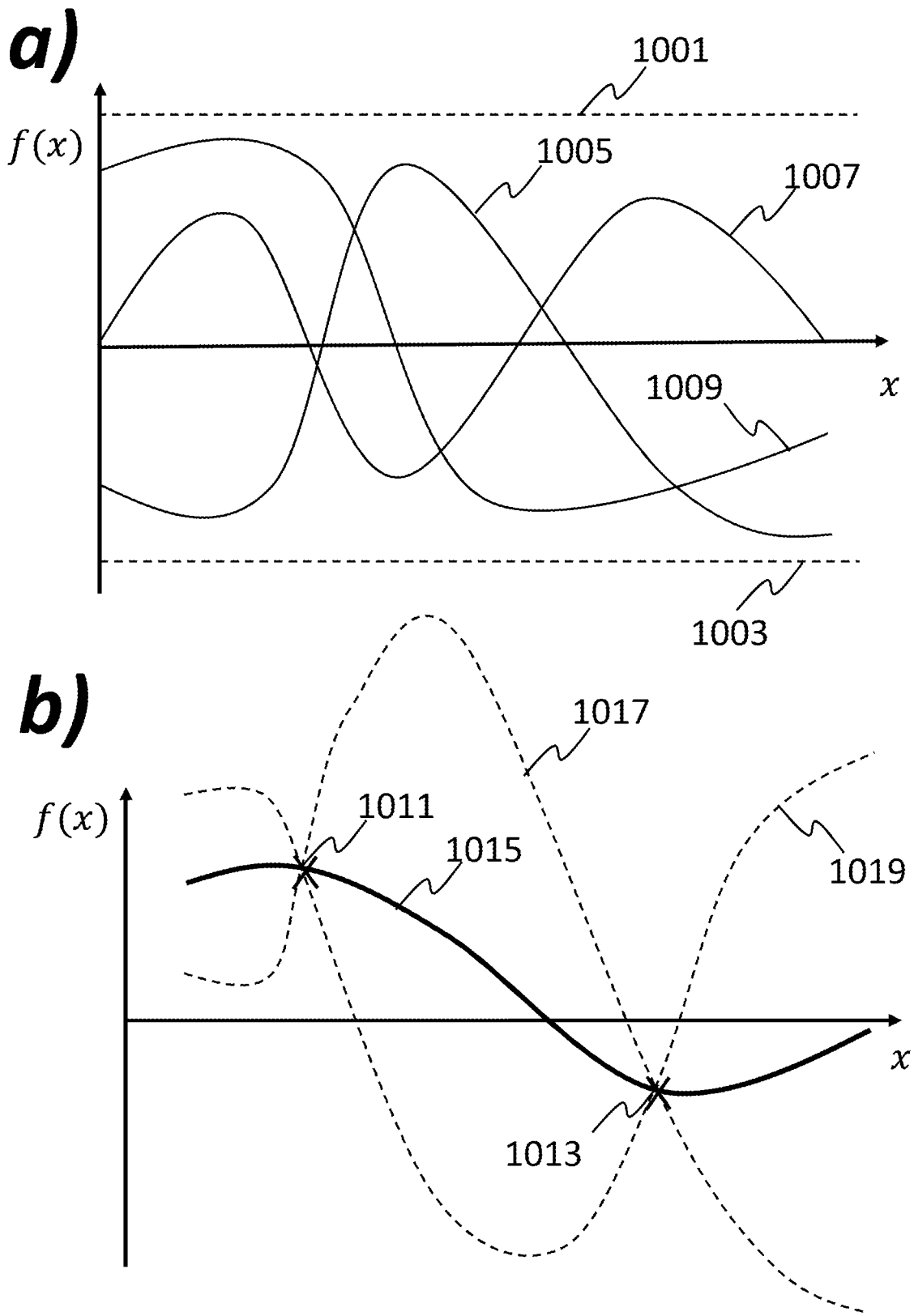
FIG. 10 shows plots of a prior distribution and a posterior distribution for a one-dimensional function.

For illustrative purposes, FIG. 10a shows an example of a prior distribution constructed for a one-dimensional function $f(x)$, which is assumed to be distributed according to a Gaussian process having a mean function of zero (the mean function of the Gaussian process lies on the x axis). Dashed lines 1001 and 1003 are each separated from the mean function by twice the standard deviation of the Gaussian process at each value of x, and solid curves 1005, 1007, and 1009 are sample functions taken from the prior distribution. Sample functions that are close to the mean function of zero have a higher probability density than sample functions that are remote from the mean function of zero.

FIG. 10b illustrates a posterior distribution $f(x)|X_2$ (denoting $f(x)$ conditioned on $X_2$), where $X_2$ is a set of two data points 1011 and 1013. Although in this example the observations of the function are made directly, in an inhomogeneous Poisson process model the data is related indirectly to the function through a likelihood equation (for example Equation (4)). Solid line 1015 shows the mean function of the posterior distribution and dashed lines 1017 and 1019 are each separated from the mean function by twice the standard deviation of the posterior distribution. In this example, the mean function represented by solid line 1015 passes through both of the data points, and the standard deviation of the posterior distribution is zero at these points. This is not necessarily the case for all posterior distributions conditioned on a set of points.

More generally, a prior distribution is constructed by assuming $f(x)$ is distributed as a Gaussian process: $f(x) \sim GP(0, k(x, x'))$, which has a mean function of zero and a covariance function $k(x, x')$ having a specific form as will be described hereafter. In one specific example, $k(x, x')$ that is a member of the Matérn family with half-integer order. It is further assumed that $f(x)$ depends on a (2M+1)-dimensional vector u of inducing variables $u_m$ for m=1, . . . ,2M 30 1, where 2M+1<N. As will be described in more detail hereafter, the inducing variables $u_m$ are assumed to be randomly distributed, having co-ordinates that are expressible in terms of a set of Fourier components, such that the variational method used for approximating the posterior $p(f(x)|X_N)$ is tractable and may be implemented at a relatively low computational cost in terms of floating point operations.

Any conditional distribution of a Gaussian process is also a Gaussian process. In this case, the distribution $f(x)|u$ conditioned on the inducing variables u is written in a form given by Equation (6):

$$f(x)|u \sim GP(k_u(x)^T K_{uu}^{-1} u, k(x, x') - k_u(x)^T K_{uu}^{-1} k_u(x')), \quad (6)$$

in which the $m^{th}$ component of the vector function $k_u(x)$ is defined as $k_u(x)[m] \equiv cov(u_m, f(x))$, and the (m, m') element of the matrix $K_{uu}$ is defined as $K_{uu}[m, m'] \equiv cov(u_m, u_{m'})$, with cov denoting the covariance $cov(X, Y) \equiv \mathbb{E}((X - \mathbb{E}(X))(Y - \mathbb{E}(Y)))$, and $\mathbb{E}$ denoting the expectation. As mentioned above, the inducing variables $u_m$ are treated as being randomly distributed. In this example, the inducing variables are treated as being distributed according to a variational distribution $q(u) \sim Normal(m, \Sigma)$, which in this example is a multivariate Gaussian distribution with mean m and covariance $\Sigma$, in which the form of $\Sigma$ is restricted, as will be described hereafter. In some examples, a variational distribution may be parameterised by parameters other than the mean and covariance, as will be described in detail hereafter.

The posterior distribution is approximated by marginalising the prior distribution of $f(x)$ over the variational distribution $q(u)$. The resulting approximation is a variational Gaussian process, given by Equation (7):

$$q(f(x)) = \int q(u)q(f(x)|u)du = \quad (7)$$
$$GP(k_u(x)^T K_{uu}^{-1} m, k(x, x') + k_u(x)^T (K_{uu}^{-1} \Sigma K_{uu}^{-1} - K_{uu}^{-1}) k_u(x')).$$

The method proceeds with the objective of minimising a Kuller-Leibler divergence (referred to hereafter as the KL divergence) between the Gaussian process $q(f(x))$ used to approximate the posterior distribution and the actual posterior distribution $p(f(x)|X_N)$. The KL divergence is minimised with respect to the parameters of the variational distribution $q(u)$, for example the mean m and covariance $\Sigma$ of the variational distribution $q(u)$. The KL divergence quantifies how much the Gaussian process $q(f(x))$ diverges from the actual posterior distribution $p(f(x)|X_N)$ The KL divergence is given by equation (8):

$$KL[q(f)\|p(f|x_N)] = \mathbb{E}_{q(f(x))}[\log q(f(x)) - \log p(f(x)|X_N)], \quad (8)$$

In which $\mathbb{E}_q(f(x))$ denotes the expectation under the distribution $q(f(x))$. Equation (8) is written using Bayes' theorem in the form of Equation (9):

$$KL[q(f)\|p(f|X_N)] = \log p(X_N) - \mathbb{E}_{q(f(x))}\left[\log \frac{p(X_N|f(x))p(f(x))}{q(f(x))}\right]. \quad (9)$$

The subtracted term on the right hand side of Equation (9) is referred to as the Evidence Lower Bound (ELBO) of the KL divergence, which is simplified by factorising the distributions $p(f(x))$ and $q(f(x))$, resulting in Equation (10):

$$ELBO = \mathbb{E}_{q(u)q(f_N|u)}[\log p(X_N|f_N)] - \mathbb{E}_{q(u)}\left[\log \frac{q(u)}{p(u)}\right], \quad (10)$$

in which $f_N = \{f(x^{(n)})\}_{n=1}^N$, $p(u) \sim Normal(0, K_{uu})$ and $q(f_N|u) \sim Normal(K_{fu} K_{uu}^{-1} u, K_{ff} - K_{fu} K_{uu}^{-1} K_{fu}^T)$, in which $K_{fu}[m, m'] \equiv cov(f(x^{(m)}), u_{m'})$ and $K_{ff}[m, m'] \equiv cov(f(x^{(m)}), f(x^{(m')}))$. Minimising the KL divergence with respect to the parameters of the variational distribution $q(u)$ is achieved by maximising the ELBO with respect to the parameters of the variational distribution $q(u)$. Any suitable nonlinear optimisation algorithm may be applied to maximise the ELBO. Maximising the ELBO with respect to the parameters of the variational distribution $q(u)$ includes iteratively updating a set of intermediate parameters in order to update the value of the ELBO, such that during iterations of updating the set of intermediate parameters, the value of the ELBO converges towards a maximum value.

In this example, a gradient-based optimisation algorithm is used to iteratively update the intermediate parameters of the variational distribution $q(u)$. Specifically, natural gradient descent is used, as described in more detail hereafter. In other examples, other optimisation algorithms may be used, such as Gradient Descent, Adam, or Limited-Memory Broyden-Fletcher-Goldfarb-Shanno (L-BFGS). Natural gradient descent has not been applied before in the context of non-conjugate Gaussian process models (Gaussian process models in which the likelihood is not conjugate to the prior distribution, as is the case in the present example), and has advantages over other methods in terms of convergence and computational efficiency, as will be described hereafter.

A specific representation of the inducing variables u is chosen in order to achieve tractability of the ELBO given by Equation (10). In the particular, the inducing variables u are assumed to lie in an interval [a, b], and are related to components of a truncated Fourier basis on the interval [a, b], the basis defined by entries of the vector $\phi(x) = [1, \cos(\omega_1(x-a)), \ldots, \cos(\omega_M(x-a)), \sin(\omega_1(x-a)), \ldots, \sin(\omega_M(x-a))]^T$, in which $\omega_m = 2\pi m/(b-a)$. The interval [a, b] is chosen such that all of the data $X_N$ lie on the interior of the interval. It can be shown that increasing the number of inducing variables necessarily improves the approximation in the KL sense, though increases the computational cost of implementing the method. The co-ordinates of the inducing variables $u_m$ are dependent on a Reproducing Kernel Hilbert Space (RKHS) inner product of the latent function $f(x)$ with the components of the truncated Fourier basis $\phi(x)$. In this example, the co-ordinates given by $u_m = P_{\phi m}(f(x))$, where the operator $P_{\phi m}$, denotes the RKHS inner product, i.e. $P_{\phi m}(\phi(x)) \equiv \langle \phi_m, f(x) \rangle_H$. The components of the resulting vector function $k_u(x)$ are expressible in terms of the components of the truncated Fourier basis $\phi(x)$ by Equation (11):

$$k_u(x)[m] = \begin{cases} \phi_m(x) & \text{for } x \in [a, b] \\ \text{cov}(P_{\phi_m}(x), f(x)) & \text{for } x \notin [a, b] \end{cases}, \quad (11)$$

In the cases of Matérn kernels of orders 1/2, 3/2, and 5/2, simple closed-form expressions are known for the RKHS inner product (see, for example, Durrande et al, "Detecting periodicities within Gaussian processes", *Peer J Computer Science*, (2016)), leading to closed-form expressions for $k_u(x)[m]$ both inside and outside of the interval [a, b]. Using the chosen inducing variables, elements of the matrix $K_{uu}$ are expressible in terms of the components of the truncated Fourier basis$\phi$, and are given by $K_{uu}[m, m'] = \langle \phi_m, \phi_{m'} \rangle_H$. Due to the elements of the matrix $K_{uu}$ being expressible in terms of the components of the truncated Fourier basis $\phi$, the elements of $K_{uu}$ are readily calculated in the case of Matérn kernels of orders 1/2, 3/2, and 5/2, leading to a diagonal matrix plus a sum of rank one matrices, as shown by Equation (12):

$$K_{uu} = \text{diag}(\alpha) + \sum_{j=1}^{J} \beta_j \gamma_j^T, \quad (12)$$

where $\alpha$, $\beta_j$, and $\gamma_j$ for $j=1, \ldots, J$ are vectors of length $2M+1$. In this example, the covariance matrix $\Sigma$ is restricted to having the same form as that given in Equation (12) for $K_{uu}$, though in other examples, other restrictions may be applied to the form of $\Sigma$. In some examples, no restrictions are applied to the form of $\Sigma$.

The closed-form expressions associated with Equation (11), along with the specific form of the matrix given by Equation (12), lead directly to the tractability of the ELBO given by Equation (10), as will be demonstrated hereafter. The tractability of the ELBO overcomes the problem of double-intractability that prevents other methods of evaluating the posterior distribution in Equation (3) from being applicable in many probabilistic modelling contexts.

Notably, the method described herein results in tractability of the ELBO without discretisation of the domain $\chi$, in contrast with existing methods.

The present method is applicable to any kernel for which the RKHS associated with the kernel contains the span of the Fourier basis $\phi(x)$, and in which the RKHS inner products are known (for example, in which the RKHS inner products have known closed-form expressions).

By way of example, in the case of a Matérn kernel of order 1/2 with variance $\sigma^2$ and characteristic length scale l, defined by $k_{1/2}(x, x') \equiv \sigma^2 \exp(-|x-x'|/l)$, the matrix $K_{uu}$ is given by Equation (12) with $J=1$, and in this case $\alpha$, $\beta_1$, and $\gamma_1$ are given by Equation (13):

$$\alpha = \quad (13)$$
$$\frac{b-a}{2} [2s(0)^{-1}, s(\omega_1)^{-1}, \ldots, s(\omega_M)^{-1}, s(\omega_1)^{-1}, \ldots, s(\omega_M)^{-1}]^T,$$
$$\beta_1 = \gamma_1 = [\sigma^{-1}, \sigma^{-1}, \ldots, \sigma^{-1}, 0, \ldots, 0]^T,$$

with $s(\omega) = 2\sigma^2 \lambda^2 (\lambda^2 + \omega^2)^{-1}$ and $\lambda = l^{-1}$. The components of vector function $k_u(x)$ for $x \notin [a, b]$ are given by Equation (14):

$$k_u(x)[m] = \begin{cases} \exp(-\lambda(|x-c|)) & \text{for } m = 1, \ldots, M+1 \\ 0 & \text{for } m = M+2, \ldots, 2M+1 \end{cases}, \quad (14)$$

where c is whichever of a or b is closest to x. In order to evaluate the ELBO, the first term on the right hand side of Equation (10) is expanded as in Equation (15):

$$\mathbb{E}_{q(u)q(f_N|u)}[\log p(X_N | f_N)] = \mathbb{E}_{q(u)q(f_N|u)} \left[ \sum_{n=1}^{N} f^2(x^{(n)}) - \int_\tau f^2(x) dx \right]. \quad (15)$$

Substituting Equation (7) into Equation (15), the first term on the right hand side of Equation (15) results in a sum of one-dimensional integrals that are straightforward to perform using any well-known numerical integration scheme (for example, adaptive quadrature), and the computational cost of evaluating this term is therefore proportional to N, the number of data points. The second term involves a nested integral that is prima facie doubly intractable. However, the outer integral is able to be performed explicitly, leading to the second term being given by a one-dimensional integral $-\int_\tau \{(k_u(x)^T K_{uu}^{-1} m)^2 + k_u(x)^T [K_{uu}^{-1} \Sigma K_{uu}^{-1} - K_{uu}^{-1}] k_u(x)\} dx$. The integrals involving $k_u(x)$ are calculated in closed form using the calculus of elementary functions.

Due to the form of $K_{uu}$ given by Equation (12), the number of floating point operations necessary to calculate the inverse $K_{uu}^{-1}$ is proportional to M, as opposed to being proportional to $M^3$ as would be the case for a general matrix of size $(2M+1) \times (2M+1)$. The relatively low computational cost of calculating the inverse $K_{uu}^{-1}$, along with the integrals involving $k_u(x)$ in the right hand side of Equation (15) being calculated in closed form, lead to the right hand side of Equation (15) being tractable, and having a computational complexity of O(NM) floating point operations, where O denotes the asymptotic order as N, M$\to \infty$.

The second term on the right hand side of Equation (10) is evaluated as in Equation (16) to give $$-\mathbb{E}_{q(u)} \left[ \log \frac{q(u)}{p(u)} \right] = \frac{1}{2}(M - \log|K_{uu}| - \log|\Sigma| - tr[K_{uu}^{-1}(mm^T + \Sigma)]). \quad (16)$$

As discussed above, the number of operations required to calculate the inverse $K_{uu}^{-1}$ is proportional to M. Similarly, the number of operations required to calculate the determinants $|K_{uu}|$ and $|\Sigma|$ is proportional to M. The computational complexity of evaluating the ELBO is therefore O(NM) floating point operations.

Figure 11:
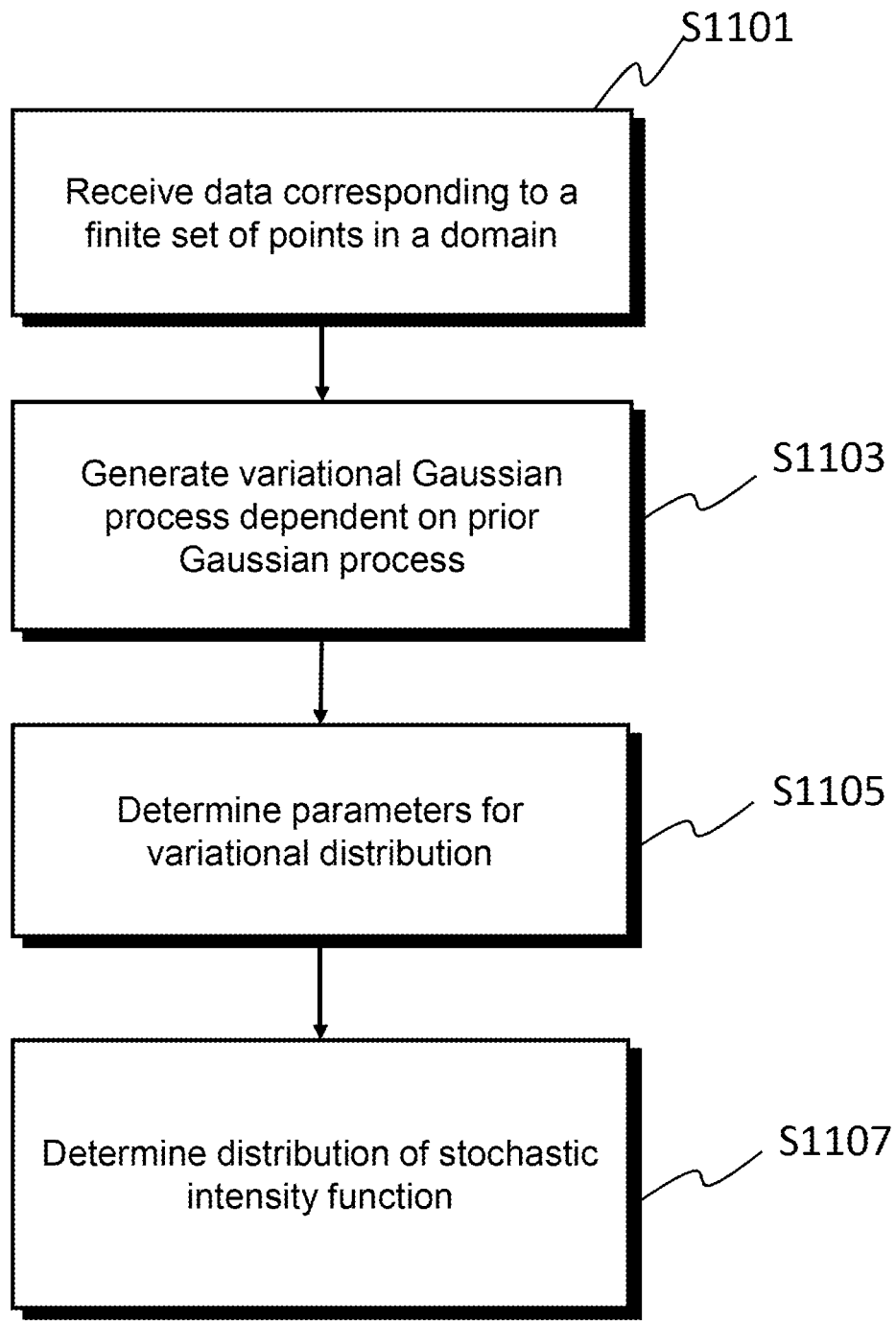
FIG. 11 is a flow diagram representing operations to generate a distribution of a stochastic intensity function according to an embodiment of the invention.

The operations discussed above will now be summarised with reference to FIG. 11. As shown, a finite set of discrete data $X_N$ is received, at S1101, corresponding to a finite set of points in the domain $\chi$. The variational Gaussian distribution $q(f(x))$ is then generated, at S1103, corresponding to the distribution of the latent function $f(x)$ and depending on the prior Gaussian process and the set u of randomly-distributed inducing variables, the inducing variables having a variational distribution q(u) and expressible in terms of a set of Fourier components $\phi(x)$. Next, a set of parameters for the variational distribution q(u) is determined, at S1105, using the data corresponding to the finite set of points in the domain. Determining the set of parameters involves iteratively updating a set of intermediate parameters to determine an optimal value of the ELBO, the ELBO being dependent on the inducing variables u and expressible in terms of the set of Fourier components $\phi(x)$, and therefore tractable as discussed above. The distribution of the stochastic intensity function $\lambda(x)$ is determined, at S1107, by computing a distribution of the quadratic function of the latent function $f(x)$.

Method for avoiding Zero-Crossings

In the method described above, the stochastic intensity function $\lambda(x)$ is given by a quadratic function of the latent function $f(x)$, which has a distribution given by the variational Gaussian process of Equation (7). Specifically, the stochastic intensity function $\lambda(x)$ is given by the square of the latent function $f(x)$ according to the identity $\lambda(x) \equiv [f(x)]^2$. In another example according to the present invention, the stochastic intensity function $\lambda(x)$ is given by a different quadratic function of a latent function $\tilde{f}(x)$. Specifically, the stochastic intensity function $\lambda(x)$ is given in terms of the latent function $\tilde{f}(x)$ by the identity $\lambda(x) \equiv [\tilde{f}(x)+\beta]^2$, where $\beta$ is an additive offset term that is independent on x. The method described above remains applicable in this case mutatis mutandis, with $\tilde{f}(x)$ having a distribution given by the variational Gaussian process of Equation (7), and with $f(x)$ substituted by $\tilde{f}(x)+\beta$ in the above equations where appropriate. As a result, the ELBO acquires additional terms, but these terms are straightforwardly evaluated due to the special forms of $K_{uu}$ and $k_u(x)$ discussed above, and do not result in a significant increase in computational complexity.

Experiments using the method described in the previous section have shown that if, during the optimisation procedure, an intermediate estimate of the function $f(x)$ changes sign at one or more points within $\chi$, subsequent intermediate estimates of $f(x)$ are likely to change sign at the same points. This can result in numerical artefacts in which $\lambda(x)$ is artificially forced to zero at the points where $f(x)$ changes sign, which limits the efficacy of the optimisation method. Including an offset $\beta$ can reduce the probability of $\tilde{f}(x)$ changing sign and hence can mitigate the effects of unwanted numerical artefacts.

In some examples, the offset $\beta$ is initialised to a predetermined value and then optimised alongside other parameters of the model as will be described hereafter. In a specific example, $\beta$ is initialised based on an estimate $\bar{\lambda}$ of the stochastic intensity function $\lambda$, where the estimate $\bar{\lambda}$ is based on an assumption that the observed points $\{x^{(n)}\}_{n=1}^{N}$ are uniformly distributed in the sub-region $\tau$ of the domain $\chi$. The estimate $\bar{\lambda}$ is thereby given by Equation (17):

$$\bar{\lambda} = \frac{N}{|\tau|}. \qquad (17)$$

Experiments have shown that initialising $\beta \approx \bar{\lambda}^{1/2}$, and then optimising $\beta$ as described hereafter, successfully mitigates the effects of unwanted numerical artefacts in many cases. In some examples, an initial value of the offset $\beta < \bar{\lambda}^{1/2}$ is chosen, for example $\beta = 2\bar{\lambda}^{1/2}/3$.

Extension of Variational Gaussian Process Method to D Dimensions

The method of generating a probabilistic model described in the previous section is straightforwardly extended to multiple dimensions. Extending the method to multiple dimensions is necessary for many applications in which a probabilistic model is generated to be incorporated into a reinforcement learning environment. In an example of managing a fleet of taxis in a city, the domain over which a probabilistic model is generated includes one temporal dimension and two spatial dimensions corresponding to a two-dimensional representation of the city, and therefore D=3.

Two ways of extending the method described above to multiple dimensions are discussed below.

Method 1: Additive Kernels

The simplest way to extend the method above to multiple dimensions is to use a prior distribution that is a sum of independent Gaussian processes corresponding to the D dimensions of the domain, as shown in equation (18):

$$f(x) = \sum_{d=1}^{D} f_d(x_d), \qquad (18)$$

in which $f_d \sim GP(0, k_d(x_d, x'_d))$. For each dimension, the kernel $k_d(x_d, x'_d)$ has a form compatible with the one-dimensional method described above (for example, each may be a Matérn kernel of half-integer order). This leads to a prior having an additive kernel, as shown in Equation (19):

$$f(x) \sim GP\left(0, \sum_{d=1}^{D} k_d(x_d, x'_d)\right) \qquad (19)$$

A matrix of features is constructed in analogy to the inducing variables of the one-dimensional case, such that $u_{m,d} = P_{\phi_m}(f_d)$, resulting in DM features. It is straightforward to show that $\text{cov}(u_{m,d}, u_{m,d'}) = 0$ for $d \neq d'$, and hence the $K_{uu}$ matrix in the additive case is of block-diagonal form $K_{uu} = \text{diag}(K_{uu}^{(1)}, \ldots, K_{uu}^{(D)})$, where each of the matrices $K_{uu}^{(d)}$ for $d=1, \ldots, D$ takes the convenient form given by Equation (12).

For the additive kernel case, the ELBO is tractable analogously to the one-dimensional case above, and the method proceeds with analogy to the one-dimensional case. The computational complexity increases linearly with the number of dimensions, making the additive kernel particularly suitable for high-dimensional problems.

Method 2: Separable Kernels

A second way to extend the method above to multiple dimensions is to use a prior distribution with a separable kernel, as shown in Equation (20):

$$f(x) \sim GP\left(0, \prod_{d=1}^{D} k_d(x_d, x'_d)\right), \quad (20)$$

where each kernel factor $k_d(x_d, x'_d)$ has a form compatible with the one-dimensional method described above. A vector of features of length $(2M+1)^D$ is constructed as the Kronecker product of truncated Fourier bases over $[a_d, b_d]$ for each dimension, as shown in Equation (21):

$$\tilde{\phi}(x) = \otimes_d[\phi_1(x_d), \ldots, \phi_{2M+1}(x_d)]^T \quad (21)$$

Inducing variables u are defined analogously to the one-dimensional case, with $u_m = P_{\phi_m}(f)$. The resulting $K_{uu}$ matrix in the separable case is given by the Kronecker product of $K_{uu} = \otimes_d K_{uu}^{(d)}$, where each of the matrices $K_{uu}^{(d)}$ for $d = 1, \ldots, D$ takes the form given by Equation (12).

For the separable kernel case, the number of inducing variables grows exponentially with the number of dimensions, allowing for very detailed representations with many basis functions. The ELBO is still tractable and the required integrals can still be calculated in closed form. However, the computational complexity is proportional to $M^D$, and therefore the separable kernel case may require more computational resources than the additive kernel case for cases of high dimensions.

Optimisation using the Natural Gradient Method

The method described above generates a probabilistic model by altering the parameters of the variational distribution q(u) in order to maximise the ELBO given by Equation (10). In the example discussed above the variational distribution q(u) is parameterised in terms of its mean m and its covariance Σ, but in other examples the variational distribution q(u) may be parameterised in other ways, as will be described below.

Generally, a chosen parameterisation of q(u) corresponding to a parameter vector ξ is expressible in terms of a distinguished natural parameterisation of q(u) corresponding to a natural parameter vector θ. An invertible mapping ξ(θ) converts between the parameter vector and the natural parameter vector θ. Gradient-based optimisation methods iteratively update the parameter vector ξ to form a sequence of parameter vectors $\{\xi_t\}_{t=0}^T$, where $\xi_T$ is a converged parameter vector that sufficiently approximates an optimal parameter vector ξ* according to predefined convergence criteria. The optimal parameter vector ξ* is defined as a parameter vector that maximises the ELBO of Equation (10). A general example of an update rule for updating the parameter vector ξ is given by Equation (22):

$$\xi_{t+1} = \xi_t - \gamma_t P^{-1} g_t, \quad (22)$$

in which: $g_t = \nabla_\xi^T \mathcal{L}|_{\xi=\xi_t}$ where $\mathcal{L}$ is the ELBO given by Equation (10); $\gamma_t$ is the step size, which may be fixed or may vary with step number; and P is a preconditioning matrix that affects the direction and the size of the change in the parameter vector ξ induced by the update (17). Different gradient-based optimisation methods vary from each other by using different preconditioning matrices. For gradient descent (referred to hereafter as ordinary gradient descent), P is an identity matrix. For Adam, P is a diagonal matrix with components given as described in the following section. For L-BFGS, P is an approximation of the Hessian matrix of q(u). For natural gradient descent, P is given by the Fisher information matrix $F_\xi$, where the Fisher information matrix $F_\xi$ is defined by Equation (23):

$$F_\xi = \mathbb{E}_{q(u)} \nabla_\xi^2 \log(q(u)) \quad (23)$$

Defining the natural gradient of $\mathcal{L}$ as $\tilde{\nabla}_\xi \mathcal{L} = (\nabla_\xi \mathcal{L}) F_\xi^{-1}$, the update rule (22) for natural gradient descent is written as:

$$\xi_{t+1} = \xi_t - \gamma_t \tilde{\nabla}_\xi^T \mathcal{L}|_{\xi=\xi_t} \quad (24)$$

For small changes in each iteration of the natural gradient method as given by Equation (19) updates the vector in a direction that maximises the KL divergence between q(u) for the updated parameter vector and q(u) for the previous parameter vector. For a given sequence of step sizes, a sequence of updates resulting from Equation (24) has the special property that it is independent of the choice of parameterisation.

Figure 12:
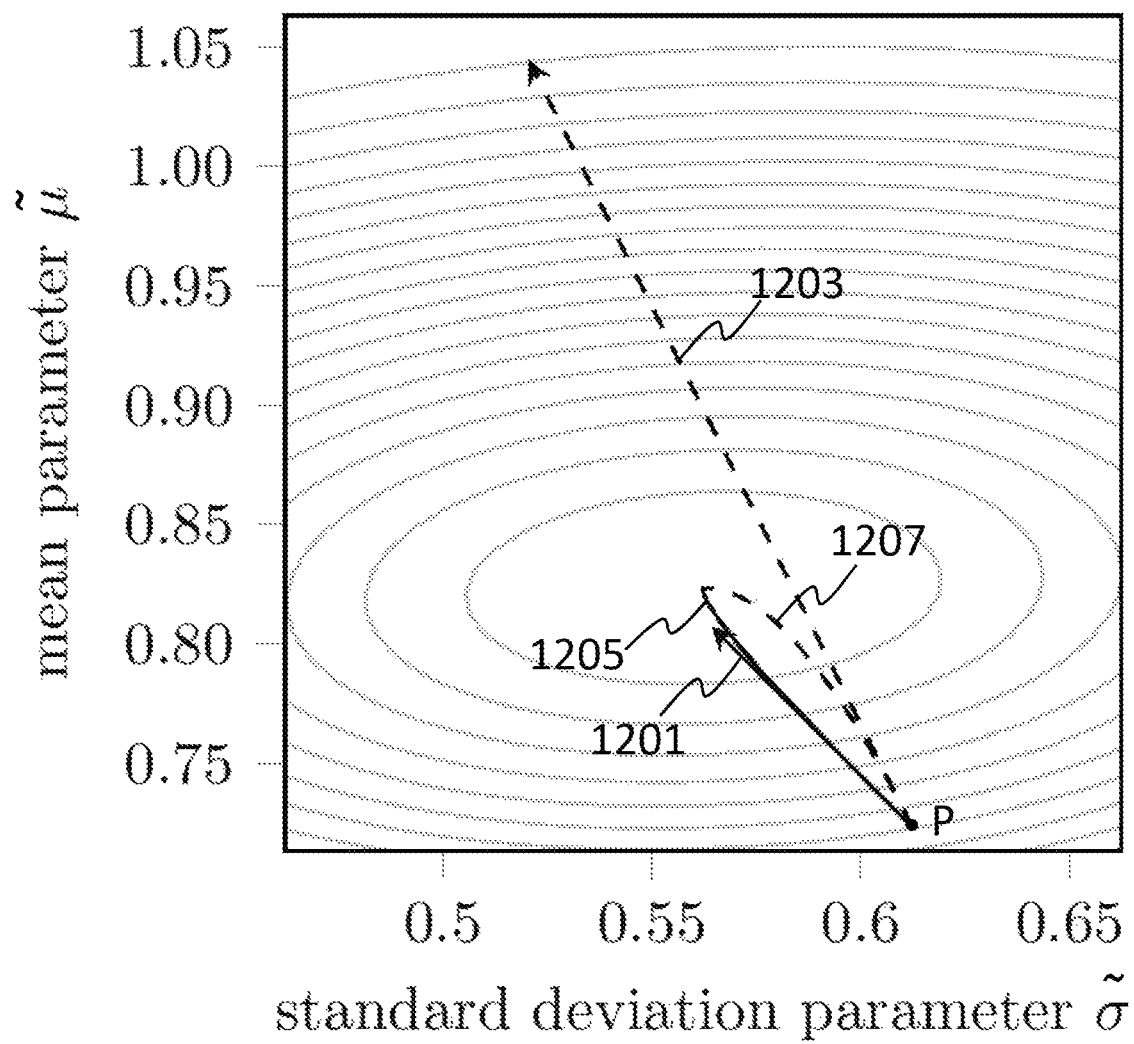
FIG. 12 is a contour plot showing optimisation steps for two different optimisation methods.

The plot of FIG. 12 illustrates the advantage of using natural gradient descent as opposed to ordinary gradient descent to optimise a variational Gaussian process dependent on a variational Gaussian distribution parameterised in a two-dimensional parameter space by its mean $\bar{\mu}$ and its standard deviation $\bar{\sigma}$. The contours in the plot represent the ELBO for the variational Gaussian process, and the values on the axes correspond to the components of the two-dimensional parameter vector $\bar{\xi} = (\bar{\sigma}, \bar{\mu})^T$. The solid arrow 1201 represents the natural gradient of the ELBO at point P and the dashed arrow 1203 represents the ordinary gradient of the ELBO with respect to the parameter vector ξ. The solid curve 1205 represents a path taken by following very small steps according to Equation (24) using natural gradient descent, and the dashed curve 1207 represents a path taken by following very small steps according to Equation (22) using ordinary gradient descent. It is observed that the solid arrow 1201 representing the natural gradient is directed in a more accurate direction than the dashed arrow 1203 representing the ordinary gradient, and further that the solid arrow 1201 representing the natural gradient is appropriately scaled. The latter property is due to the fact that the natural gradient is independent of the parameterisation, as discussed above. By contrast, updates according to Equation (22) that do not use the natural gradient are generally dependent on a chosen parameterisation, and hence there is no assurance that the scaling of the update will be appropriate. In the example of FIG. 12, the ordinary gradient is significantly larger in magnitude than the distance $|\xi_t - \xi^*|$ between the parameter vector at time step t and the optimal parameter vector, and the step size for an update based on Equation (17) using ordinary gradient descent would therefore have to be small in order to ensure convergence. By contrast, an example of a novel, robust scheme for achieving rapid convergence using the natural gradient in a non-conjugate Gaussian process model is to use a step size that varies according to two phases. During the first phase, in which the distance $|\xi_t - \xi^*|$ takes relatively large values, the step size starts at a small value and increases with step number over a predetermined number of iterations until it reaches a predetermined value. In some examples, the predetermined value is of the order of unity. In the second phase, the step size remains at a constant or approximately constant value, for example the predetermined value from the first phase. During the second phase, the step size is chosen to be of the order of unity. One example of such a scheme is to increase the step size log-linearly over K steps, such that $\gamma_0 = \gamma_{initial}$ and $\gamma_K = \gamma_{final}$, and to fix $\gamma_t = \gamma_{final}$ for $t > K$. In a specific example, $\gamma_{initial} = 10^{-4}$, $\gamma_{final} = 10^{-1}$, and K=5. Other combinations of $\gamma_{initial}$, $\gamma_{final}$, and K are also expected to lead to robust performance for $\gamma_{initial} < \gamma_{final}$, as are other schemes in which the sequence $\{\gamma_t\}_{t=0}^T$ has an initial increasing phase followed by a phase in which $\gamma_t$ remains constant or approximately constant. Robust performance refers to cases in which the sequence $\{\xi_t\}_{t=0}^T$ of parameter vectors reliably converges, independent of the initial parameter vector $\xi_0$ and other characteristics of the optimisation problem. Using a simple scheme such as the one described above for adjusting step sizes eliminates the necessity to implement a subroutine in which a step size is calculated that is appropriate for each step, for example by implementing a line search method. For optimisation methods other than natural gradient descent, such subroutines may be necessary for ensuring convergence or for ensuring rapid convergence, resulting in additional computational cost. In some examples, optimisation methods other than natural gradient descent are unable to converge to an optimal result, regardless of the chosen sequence of step sizes, as will be discussed hereafter.

An efficient method for calculating the natural gradient will now be described. The natural gradient is related to the natural parameterisation $\theta$ and a second distinguished parameterisation called the expectation parameterisation $\eta$. General definitions of these parameterisations are known in the art. In terms of the parameterisation described in the example above (the mean and covariance $(m, \Sigma)$ of the distribution $q(u)$), the natural and expectations parameterisations are given by:

$$\tilde{\theta} = (\Sigma^{-1}m, -1/2\Sigma^{-1}), \tilde{\eta} = (m, \Sigma + mm^T), \quad (25)$$

and the parameter vectors $\theta$ and $\eta$ are formed by arranging the components of the parameter sets $\tilde{\theta}$ and $\tilde{\eta}$ respectively into vectors. For a chosen parameterisation, the transpose of the natural gradient (which appears in the update rule of Equation (24)) is given by $$\tilde{\nabla}_{\xi^T} \mathcal{L} = \frac{\partial \xi}{\partial \theta} \frac{\partial \mathcal{L}}{\partial \eta^T}. \quad (26)$$

The right hand side of Equation (21) is recognisable as a Jacobian-vector product, and therefore Equation (21) is a forward-mode differentiation. Forward-mode automatic differentiation libraries are less common than reverse-mode automatic differentiation libraries. However, the forward-mode differentiation can be achieved efficiently by applying reverse-mode differentiation twice, as described hereafter.

Reverse-mode differentiation libraries compute a vector-Jacobian product according to the following function:

$$vjp(f, x, u) = u^T \frac{\partial f}{\partial x}. \quad (27)$$

By contrast, the forward-mode differentiation of Equation (26) requires the computation of a Jacobian-vector product. Introducing a dummy variable v, the forward-mode differentiation of Equation (26) is given in terms of two applications of the reverse-mode differentiation function as follows:

$$\tilde{\nabla}_{\xi^T} \mathcal{L} = \left( vjp\left(g, v, \frac{\partial \mathcal{L}}{\partial \eta^T}\right)\right)^T, \quad (28)$$

$$g(v) = vjp(\xi, \theta, v). \quad (29)$$

The computation of $\tilde{\nabla}_{\xi^T}\mathcal{L}$ using Equations (28) and (29) is negligibly more computationally expensive than computing the parameter transformation $\xi(\theta)$, the computational complexity being $O(M^3)$ as $M \to \infty$, where $2M+1$ is the number of dimensions of u. By contrast, the computational complexity of a direct inversion of the Fisher information matrix as given by Equation (23) is $O(M^6)$ as $M \to \infty$. In practice, the computational cost of computing the natural gradient is a factor of approximately 1.5 times that of computing the ordinary gradient.

The method of using natural gradient descent for optimising an ELBO of a variational distribution has wider applicability than the example given above. Natural gradient descent as described above is applicable to any variational inference model in which the posterior depends on a variational distribution in the exponential family (of which the variational Gaussian distribution $q(u)$ is a member). In any such case, the method proceeds as described above, with the natural and expectation parameterisations of (25) substituted accordingly.

Optimising Hyperparameters

In the preceding section, an example was described in which natural gradient descent was applied in order to determine an optimal set of parameters for a variational Gaussian process. Generally, a variational Gaussian process is also dependent on hyperparameters of the prior Gaussian process (for example, the variance $\sigma^2$ and the characteristic length scale l of the Matérn kernel). In Bayesian statistics, hyperparameters are defined as parameters of a prior distribution. In this example, the hyperparameters of the prior Gaussian process were assumed to remain constant during the optimisation routine. An alternative approach is to optimise the ELBO with respect to the variational parameter vector $\xi$ as well as the hyperparameters. A known approach to optimising the ELBO is to combine the hyperparameters with the variational parameters and to update the combined set in a single update step. Natural gradient descent as described above is not suitable for this approach, because the hyperparameters do not have a probability distribution, and hence the natural gradient is undefined. Instead, a novel method is proposed in which each update of the variational parameters using natural gradient descent is followed by an update of the hyperparameters using a different optimisation method. The resulting hybrid alternates between steps of natural gradient descent and the other chosen optimisation method. In examples in which an offset is included in order to avoid zero-crossings as described above, the offset $\beta$ may be treated as an additional hyperparameter and optimised alongside the hyperparameters of the prior distribution.

In a specific example, natural gradient descent is alternated with Adam, which is defined by the update rule of Equation (22) with P given by a diagonal matrix with elements $P_{ii} = (\sqrt{v_i} + \epsilon)m_i^{-1}$, where $m_i$ and $v_i$ are the bias-corrected exponential moving averages of the components $[g_t]_i$ and $([g_t]_i)^2$ respectively, and $\epsilon$ is a fixed small number. In this example, $\epsilon = 10^{-8}$. The step size $\gamma^{Adam}$ for the Adam update is generally different to the step size $\gamma$ used for the natural gradient update, and in this example is determined by performing a search. Specifically, the search is performed over a set of candidate step sizes $\{10^{-K}\}_{K=0}^6$, and the largest step size that remains stable is chosen.

Performance of the Natural Gradient Method

The plots of FIG. 13 demonstrate that natural gradient descent can lead to faster optimisation of an ELBO than other optimisation methods. Both plots in FIG. 13 show the convergence of an ELBO for a Gaussian process model with D=8, with a dataset including N=784 data points. In this example, the ELBO was evaluated stochastically by evaluating a random minibatch of 256 terms and scaling accordingly. Each plot shows three sets of five curves, each curve corresponding to an average of 5000 iterations of the optimisation routine using different random minibatches.

In FIG. 13a, the hyperparameters of the model were kept constant, and the ELBO was optimised with respect to the parameters of the variational distribution. In FIG. 13b, the ELBO was optimised with respect to the parameters of the variational distribution and also with respect to the hyperparameters of the model.

In FIG. 13a, the first set of curves 1301 corresponds to natural gradient descent using the simple step size scheme described above, the second set of curves 1303 corresponds to Adam with $\gamma^{Adam}=10^{-1}$, and the third set of curves 1305 corresponds to ordinary gradient descent with $\gamma^{GD}=10^{-4}$. For each of the latter two methods, the step size was chosen by searching over a set of candidate step sizes $\{10^{-K}\}_{K=0}^{6}$, and choosing the largest step size that remains stable. It is observed that convergence is achieved using natural gradient descent in less time than using either of the other two methods.

In FIG. 13b, the first set of curves 1307 corresponds to the hybrid method described above in which natural gradient descent is alternated with Adam with $\gamma^{Adam}=10^{-2}$, the second set of curves 1309 corresponds to Adam with $\gamma^{Adam}=10^{-2}$, and the third set of curves 1311 corresponds to ordinary gradient descent with $\gamma^{GD}=10^{-4}$. For each of the latter two methods, the step size was chosen by searching over a set of candidate step sizes $\{10^{-K}\}_{K=0}^{6}$, and choosing the largest step size that remained stable. It is observed that convergence is achieved using the hybrid method in less time than using either of the other two methods.

Figure 14:
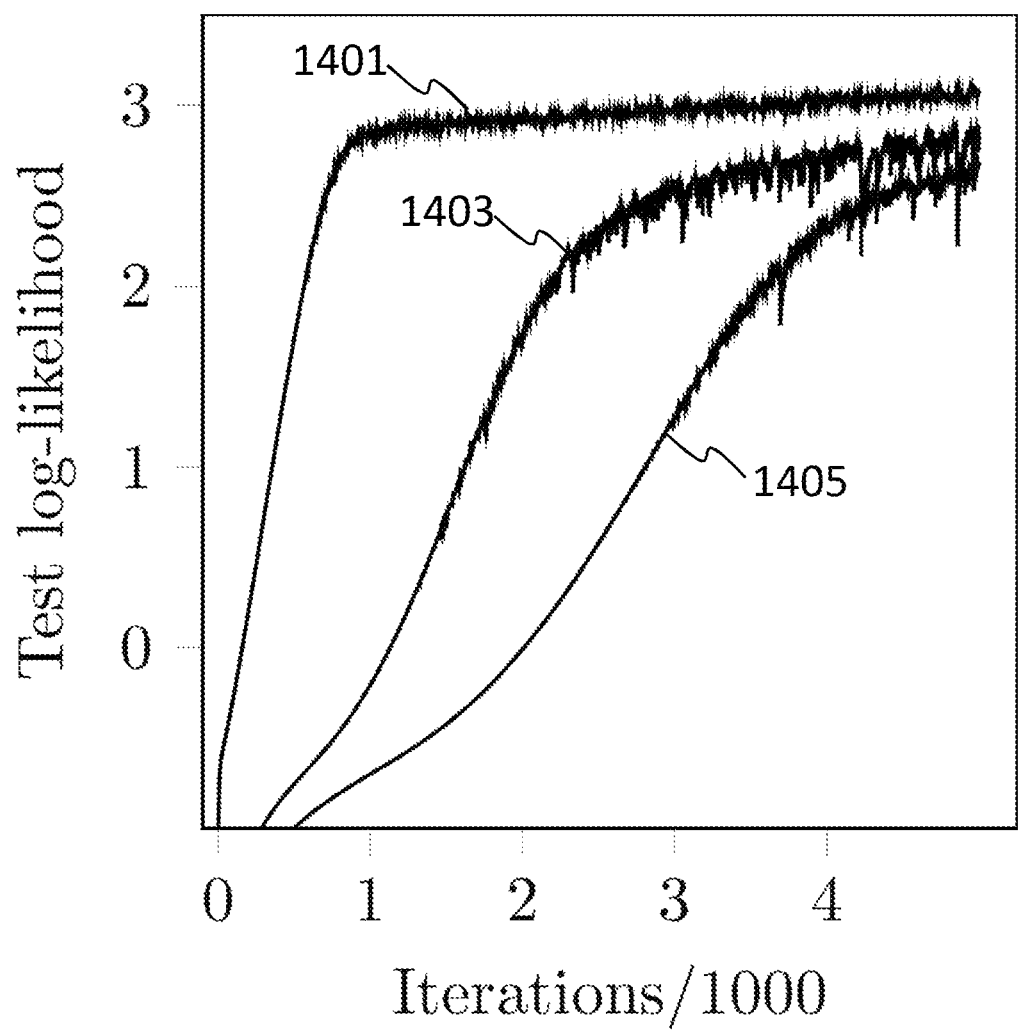
FIG. 14 shows a plot demonstrating the convergence of an optimisation objective using three different optimisation schemes, in an example where the problem is ill-conditioned.

FIG. 14 demonstrates that in certain cases, natural gradient descent can lead to optimisation of an ELBO where other optimisation methods fail. FIG. 14 shows the convergence of an ELBO for a Gaussian process model with D=16, with a dataset including N=11000 data points. In this example, test log-likelihood, as opposed to the value of the ELBO, is used to illustrate convergence. In this example, the ELBO was evaluated stochastically by evaluating a random minibatch of 256 terms and scaling accordingly, and optimised with respect to the parameters of the variational distribution and also with respect to the hyperparameters of the model. The plot shows three curves, each curve corresponding to an average of 5000 iterations of the optimisation scheme using different random minibatches. The first curve 1401 corresponds to the hybrid method described above in which natural gradient descent is alternated with Adam with $\gamma^{Adam}=10^{-2}$, the second curve 1403 corresponds to Adam with $\gamma=10^{-2}$, and the third curve 1405 corresponds to Adam with $\gamma^{Adam}=5\times10^{-3}$. It is observed that convergence is achieved in fewer iterations using the hybrid method than using either of the other two methods, and further that the converged value of the test log-likelihood is higher for the hybrid method than for either of the other two methods. The reason for the hybrid method achieving superior performance on the dataset of FIG. 14 is that the posterior in this case is ill-conditioned. It is known that ordinary gradient descent, and other optimisation methods, suffer from slow convergence and instability in ill-conditioned settings. By contrast, natural gradient descent does not suffer from these issues due to the fact that the natural gradient is invariant with respect to parameterisation, as discussed above.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A reinforcement learning system comprising:
   an environment having multiple possible states;
   an agent arranged to receive state information indicative of a current state of the environment and to generate an action signal dependent on the state information and a policy associated with the agent, the action signal being operable to cause a change in a state of the environment, the agent being further arranged to generate experience data dependent on the state information and information conveyed by the action signal;
   a policy learner configured to process the experience data, whereby to update the policy associated with the agent;
   a probabilistic model arranged to generate probabilistic data relating to future states of the environment; and
   a model learner configured to process model input data to generate the probabilistic model,
   wherein:
   the environment comprises a domain having a temporal dimension;
   the model input data comprises data indicative of events occurring in past states of the environment;
   the agent is arranged to generate the action signal further in dependence on the probabilistic data;
   the probabilistic model comprises a distribution of a stochastic intensity function, wherein an integral of the stochastic intensity function over a sub-region of the domain corresponds to a rate parameter of a Poisson distribution for a predicted number of events occurring in the sub-region; and
   the model learner is configured to process the model input data to generate the probabilistic model by applying a Bayesian inference scheme to the model input data, the Bayesian inference scheme comprising:
   generating a variational Gaussian process corresponding to a distribution of a latent function, the variational Gaussian process being dependent on a prior Gaussian process and a plurality of randomly-distributed inducing variables, the inducing variables having a variational distribution and expressible in terms of a plurality of Fourier components;
   determining, using the data indicative of events occurring in past states of the environment, a set of parameters for the variational distribution, wherein determining the set of parameters comprises iteratively updating a set of intermediate parameters to determine an optimal value of an objective function, the objective function being dependent on the inducing variables and expressible in terms of the plurality of Fourier components; and
   determining, from the variational Gaussian process and the determined set of parameters, the distribution of the stochastic intensity function, wherein the distribution of the stochastic intensity function corresponds to a distribution of a quadratic function of the latent function.

2. The system of claim 1, wherein the model learner is further configured to process the experience data generated by the agent to update the probabilistic model.

3. The system of claim 1, wherein each of the events occurring in a past state of the environment corresponds to an occurrence of an event in a physical system.

4. The system of claim 3, wherein the agent is associated with an entity in the physical system.

5. The system of claim 4, wherein the reinforcement learning system is operable to send a control signal, corresponding to the generated action signal, to the entity.

6. The system of claim 3, wherein:
the physical system comprises one or more sensors; and
the agent is arranged to receive the state information from the one or more sensors.

7. The system of claim 4, wherein:
each of the events occurring in a past state of the environment corresponds to a taxi request in a city; and
the agent is associated with a taxi in the city.

* * * * *